United States Patent
Jitsukawa

(10) Patent No.: US 9,730,212 B2
(45) Date of Patent: Aug. 8, 2017

(54) METHOD FOR WIRELESS COMMUNICATION, WIRELESS STATION, MOBILE TERMINAL, AND WIRELESS COMMUNICATION SYSTEM

(71) Applicant: FUJITSU LIMITED, Kawasaki-shi, Kanagawa (JP)

(72) Inventor: Daisuke Jitsukawa, Adachi (JP)

(73) Assignee: FUJITSU LIMITED, Kawasaki (JP)

( * ) Notice: Subject to any disclaimer, the term of this patent is extended or adjusted under 35 U.S.C. 154(b) by 271 days.

(21) Appl. No.: 13/653,569

(22) Filed: Oct. 17, 2012

(65) Prior Publication Data
US 2013/0058296 A1    Mar. 7, 2013

Related U.S. Application Data

(63) Continuation of application No. PCT/JP2010/003012, filed on Apr. 27, 2010.

(51) Int. Cl.
*H04J 1/00* (2006.01)
*H04W 72/04* (2009.01)
(Continued)

(52) U.S. Cl.
CPC ........ *H04W 72/0426* (2013.01); *H04B 7/024* (2013.01); *H04L 5/005* (2013.01); *H04L 5/0035* (2013.01); *H04L 5/0044* (2013.01); *H04L 5/0053* (2013.01); *H04L 5/0094* (2013.01); *H04W 72/1226* (2013.01); *H04B 7/0639* (2013.01); *H04L 5/0073* (2013.01); *H04W 16/06* (2013.01); *H04W 72/02* (2013.01);
(Continued)

(58) Field of Classification Search
CPC .... H04W 72/04; H04W 72/02; H04W 72/042
USPC .......................... 370/330, 334, 219, 332, 349
See application file for complete search history.

(56) References Cited

U.S. PATENT DOCUMENTS 5,832,368 A  *  11/1998  Nakano et al. ............... 455/63.1
8,274,951 B2 *   9/2012  Liu et al. ....................... 370/332
(Continued)

FOREIGN PATENT DOCUMENTS

CN            101690372         3/2010
EP            2343942 A1         7/2011
(Continued)

OTHER PUBLICATIONS

International Search Report dated Aug. 3, 2010, from corresponding International Application No. PCT/JP2010/003012.
(Continued)

*Primary Examiner* — Ricky Ngo
*Assistant Examiner* — Dewanda Samuel
(74) *Attorney, Agent, or Firm* — Katten Muchin Rosenman LLP

(57) ABSTRACT

There is a provided a wireless communication system in which multiple base station transmit the same data (PDSCH signal) in a coordinated transmission scheme. Each base station controls allocation a wireless resource that one of the remaining base station transmits a signal different from the above same data, such as a control signal or reference signal to a mobile station that is applied the coordinated transmission scheme to a mobile terminal that is different from the mobile station that is applied the coordinated transmission scheme and that is to communicate with the base station.

16 Claims, 15 Drawing Sheets

(51) Int. Cl.
*H04B 7/024* (2017.01)
*H04L 5/00* (2006.01)
*H04W 72/12* (2009.01)
*H04W 72/02* (2009.01)
*H04W 72/08* (2009.01)
*H04W 16/06* (2009.01)
*H04B 7/06* (2006.01)

(52) U.S. Cl.
CPC .......... *H04W 72/04* (2013.01); *H04W 72/042* (2013.01); *H04W 72/082* (2013.01)

(56) References Cited

U.S. PATENT DOCUMENTS

| | | | | |
|---|---|---|---|---|
| 8,364,162 | B2* | 1/2013 | Acharya | 455/452.2 |
| 8,369,429 | B2* | 2/2013 | Koo et al. | 375/260 |
| 8,427,978 | B2* | 4/2013 | Xiao | 370/254 |
| 8,521,215 | B2* | 8/2013 | Hirakawa et al. | 455/524 |
| 8,570,963 | B2* | 10/2013 | Barany et al. | 370/329 |
| 8,593,989 | B2* | 11/2013 | Sun | H04B 7/024 370/252 |
| 8,634,488 | B2* | 1/2014 | Lee et al. | 375/267 |
| 8,761,824 | B2* | 6/2014 | Palanki | H04L 5/0007 370/345 |
| 2006/0120477 | A1* | 6/2006 | Shen et al. | 375/267 |
| 2007/0248172 | A1* | 10/2007 | Mehta | H04B 7/024 375/260 |
| 2007/0280175 | A1* | 12/2007 | Cheng | H04B 7/022 370/338 |
| 2009/0092059 | A1* | 4/2009 | Fu | 370/252 |
| 2009/0286562 | A1* | 11/2009 | Gorokhov | H04B 7/0617 455/501 |
| 2009/0323616 | A1* | 12/2009 | Zeller et al. | 370/329 |
| 2010/0027456 | A1 | 2/2010 | Onggosanusi et al. | |
| 2010/0067604 | A1* | 3/2010 | Bhadra et al. | 375/267 |
| 2010/0128675 | A1 | 5/2010 | Kishiyama et al. | |
| 2010/0195599 | A1* | 8/2010 | Zhang | H04L 5/0094 370/329 |
| 2010/0261498 | A1* | 10/2010 | Ko et al. | 455/522 |
| 2010/0273514 | A1* | 10/2010 | Koo | H04B 7/024 455/501 |
| 2010/0322176 | A1* | 12/2010 | Chen et al. | 370/329 |
| 2011/0034175 | A1* | 2/2011 | Fong | H04B 7/024 455/450 |
| 2011/0103287 | A1* | 5/2011 | Ma | H04B 7/0639 370/312 |
| 2011/0218016 | A1 | 9/2011 | Hirakawa et al. | |
| 2012/0099470 | A1* | 4/2012 | Li et al. | 370/252 |
| 2013/0188596 | A1 | 7/2013 | Miki et al. | |
| 2014/0189760 | A1* | 7/2014 | Payette et al. | 725/86 |

FOREIGN PATENT DOCUMENTS

| | | |
|---|---|---|
| WO | 2009/022706 A1 | 2/2009 |
| WO | 2010/032791 | 3/2010 |

OTHER PUBLICATIONS

3GPP TS 36.211 V8.8.0 3rd Generation Partnership Project; Technical Specification Group Radio Access Network; Evolved Universal Terrestrial Radio Access (E-UTRA); Physical Channels and Modulation (Release 8), Sep. 2009.

3GPP TS 36.213 V8.8.0 3rd Generation Partnership Project; Technical Specification Group Radio Access Network; Evolved Universal Terrestrial Radio Access (E-UTRA); Physical layers procedures (Release 8), Sep. 2009.

3GPP TR 36.814 V1.6.0 3rd Generation Partnership Project; Technical Specification Group Radio Access Network; Further Advancements for E-UTRA Physical Layer Aspects (Release 9), Jan. 2010.

Chinese Office Action dated Aug. 13, 2014, from the corresponding Chinese Application No. 201080066425.2.

Office Action dated Mar. 24, 2015, from the corresponding Chinese Patent Application No. 201080066425.2.

Extended European search report dated Jul. 13, 2016 from corresponding Application No. 10850637.9.

Hatachi LDT: A UE initiated frequency partitioning based CoMP scheme for downlink cellular communications (3GPP Draft R1-101538), 3rd Generation Partnership Project (3GPP), Feb. 17, 2010, XP050419005, [retrieved on Feb. 17, 2010].

Communication pursuant to 94(3) dated Mar. 10, 2017, from the corresponding European Patent Application No. 10850637.9-1870.

* cited by examiner

FIG. 4B
arrangement of physical channel (cell 2)

RBs allocated to mobile terminals UE1 and UE2

FIG. 4A
arrangement of physical channel (cell 1)

RBs allocated to mobile terminals UE1 and UE3

METHOD FOR WIRELESS COMMUNICATION, WIRELESS STATION, MOBILE TERMINAL, AND WIRELESS COMMUNICATION SYSTEM

CROSS-REFERENCE TO RELATED APPLICATION

This application is a continuation Application of a PCT international application No. PCT/JP2010/003012 filed on Apr. 27, 2010 in Japan, the entire contents of which are incorporated by reference.

FIELD

The embodiments discussed herein are related to a scheme of Coordinated Multi-Point (CoMP) transmission in which multiple cells or multiple sectors transmit the same data to a mobile terminal in cooperation with each other in a wireless communication system.

BACKGROUND

A cellular wireless communication system has been improved from Universal Mobile Telecommunication System (UMTS) to Long Term Evolution (LTE). LTE applies Orthogonal Frequency Division Multiplexing (OFDM) and Single Carrier-Frequency Division Multiple Access (SC-FDMA) to a downlink wireless access technique and an uplink wireless access technique, respectively, to achieve high-speed wireless packet communication having a downlink peak transmitting rate of 100 Mb/s or more and an uplink peak transmitting rate of 50 Mb/s or more.

OFDM, which is the downlink access technique of LTE, allocates a wireless resource both in the time direction and the frequency direction to each user, in other words, mapping a physical channel to a resource element. Here, mapping of physical channels to adjacent cells will now be described with reference to FIGS. 1A and 1B.

FIGS. 1A and 1B depict resource blocks (RBs), which is a unit of a wireless resource allocated to each user in LTE, and illustrates an example of the respective resource blocks of two adjacent cells (FIG. 1A depicts cell 1; and FIG. 1B depicts cell 2). The abscissas and the ordinates of the resource blocks in FIGS. 1A and 1B respectively represent frequency and time in units of subframes. A resource block is a two-dimensional wireless resource unit of a frequency and a time segmented by 12 subcarriers (12 SC) and 14 OFDM symbols. A region surrounded by a single subcarrier (1 SC) and a single OFDM symbol is called a resource element (RE).

A control signal (represented by "C" in units of resource elements in FIGS. 1A and 1B) can be variably determined by the base station of each cell in a region of first through third OFDM symbols from the top. Thereby, the minimum wireless resource for transmitting a control signal can be reserved. In the example of FIGS. 1A and 1B, control signals are mapped in the first through the third leading OFDM symbols in the cell 1 and in the first through the second OFDM symbols in the cell 2.

Control signals are classified into the following three types:

(1) PCFICH (Physical Control Format Indicator Channel)
a signal that notifies the number of OFDM symbols (Control format indicator: CFI) for a control signal;

(2) PHICH (Physical Hybrid ARQ Indicator Channel)
a signal that notifies ACK/NACK information related to an unlink shared channel (PUSCH); and (3) PDCCH (Physical Downlink Control Channel)
a signal that notifies allocation information of downlink and uplink resources.

Reference signals (Cell-specific RS; in the following description, appropriately abbreviated to CRSs) peculiar to each cell are mapped equally in the time and frequency directions of a resource block. Such reference signals are used for detecting an FFT timing and for estimating a channel of a mobile terminal. Arrangement of a reference signal is shifted in the frequency direction, depending on the identification (cell ID) peculiar to each cell. In the example of FIGS. 1A and 1B, the entire arrangement of reference signals in the cell 2 is shifted by one subcarrier from that in the cell 1. This shifting avoids interference between reference signals in the adjacent cells.

FIGS. 1A and 1B are an arrangement of reference signals conforming to the MIMO (Multiple Input Multiple Output) scheme. In the drawing, "$R_0$", "$R_1$", "$R_2$", and "$R_3$" represent resource elements in which reference signals corresponding to four antenna ports (Antenna ports 0-3), respectively, are mapped.

Downlink shared channels (PDSCHs) are mapped into the remaining resource elements except for resource elements in which controls signals or reference signals are mapped. Consequently, the remaining resource elements are used for data transmission to mobile terminals. In other words, PDSCHs, i.e., data, are mapped in the resource elements not marked with "C" or "R" ("$R_0$", "$R_1$", "$R_2$", and "$R_3$") in FIGS. 1A and 1B.

For higher-speed communication, the 3rd Generation Partnership Project (3GPP), an international standardization organization, is developing a downlink technique in a wireless communication system LTE-A (LTE-Advanced) based on LTE which technique is called Coordinated Multi-Point (CoMP) transmission scheme. The CoMP transmission scheme causes multiple base stations to transmit a PDSCH to a particular mobile terminal in coordination with each other. Current agreements of the CoMP transmission scheme are described in the specification 3GPP TR 36.814.

Joint transmission (CoMP JT) is known as one of the embodiments of the CoMP transmission scheme. The basic concept of CoMP JT will now be described with reference to FIG. 2.

In normal cellular communication, a mobile terminal receives an interference signal from a second cell adjacent to a first cell that the mobile terminal is connecting. For this reason, the communication has a problem of large deterioration of receiving characteristic of a mobile terminal especially positioning at a boundary of a cell. In contrast, CoMP JT causes the base stations of multiple cells (cell 1, cell 2) to transmit PDSCHs based on the same data to a particular mobile terminal UE 1, as illustrated in FIG. 2. With this configuration, since a mobile terminal receives a desired signal containing the same data from a base station that the mobile terminal is connecting and also from a contiguous base station, the above problem of deterioration in receiving characteristic of a mobile terminal at a cell boundary can be solved.

The receiving characteristic of a mobile terminal at a cell boundary can be further improved by transmitting a PDSCH after being subjected to an encoding scheme known as Precoding (a kind of transmitting beam forming) at a wireless mobile station. LTE applies the Codebook scheme to the Precoding (see the specification 3GPP TS 36.211, and 36.213). Specifically, multiple candidates for a Precoding matrix to be multiplied by a transmitting signal are prepared commonly to a transmitter station and a receiver station. The receiver station selects an optimum candidate of the Precoding matrix using the result of estimating a wireless channel state, and feeds the identifier (Precoding Matrix Indicator: PMI) of the selected Precoding matrix to the transmitter station. The transmitter station multiplies the Precoding matrix corresponding to the feedback PMI by a transmitting signal and then transmits the processed transmitting signal to the receiver station.

Non-Patent Literature 1: 3GPP TS 36.211 V8.8.1 (2009-09), 3rd Generation Partnership Project; Technical Specification Group Radio Access Network; Evolved Universal Terrestrial Radio Access (E-UTRA); Physical Channels and Modulation (Release 8)

Non-Patent Literature 2: 3GPP TS 36.213 V8.8.0 (2009-09), 3rd Generation Partnership Project; Technical Specification Group Radio Access Network; Evolved Universal Terrestrial Radio Access (E-UTRA); Physical layer procedures (Release 8)

Non-Patent Literature 3: 3GPP TR 36.814 V1.6.0 (2010-1), 3rd Generation Partnership Project; Technical Specification Group Radio Access Network; Further Advancement for E-UTRA; Physical Layer Aspects (Release 9)

Here, on the premise of the mapping of physical channels of resource blocks of FIGS. 1A and 1B, it is assumed that multiple base station transmit PDSCHs based on the same data to a particular mobile terminal through the CoMP JT scheme. Specifically, CoMP JT is applied to between the base stations of the cell 1 and the cell 2 depicted in FIGS. 1A and 1B. FIG. 3 illustrates problems of this case. FIGS. 3A and 3B correspond to FIGS. 1A and 1B, respectively. In FIGS. 3A and 3B, a resource element in which a reference signal is mapped is represented by "R" and a resource element in which a PDSCH to be transmitted in the CoMP JT scheme is not mapped is represented by "X".

In FIGS. 3A and 3B, a PDSCH based on the same data can be arranged to a resource element in which the base stations of the cell 1 and the cell 2 can commonly map a PDSCH. Unfortunately, a resource element in which either cell maps a signal different from a PDSCH, that is a control signal ("C") or a reference signal ("R"), does not achieve the CoMP JT scheme. For example, since reference signals "R" are mapped in the resource elements in the cell 2 corresponding to those marked with "X" in the cell 1, the CoMP JT is not achieved in the above resource elements. Since control signals are mapped in the third OFDM symbol in the resource block of the cell 1, the corresponding OFDM symbol of the cell 2 does not achieve the CoMP scheme.

As the above, since multiple base stations do not transmit a PDSCH based on the same data through a wireless resource in which either cell maps a signal different from a PDSCH, i.e., a control signal or a reference signal, data transmission efficiency is poor.

SUMMARY (1) According to an aspect of the embodiments, a method includes a method for wireless communication that a first wireless base station and a second wireless base station transmit the same data to a first mobile terminal, the method including: at each of the first wireless base station and the second wireless base station, allocating a wireless resource for signal transmission to a mobile terminal that is to communicate with the wireless base station; at the second wireless base station, allocating, to a second mobile terminal different from the first mobile terminal, a first wireless resource that the first wireless base station uses to transmit a first signal different from the same data to the first mobile terminal; and at the second mobile terminal, receiving data sent from the second wireless base station through the first wireless resource.

(2) According to an aspect of the embodiments, an apparatus includes a wireless base station that transmits, to a first mobile terminal, the same data as that a second wireless base station transmits to the first mobile terminal, the wireless base station including an allocation controller that allocates a wireless resource to a mobile terminal that is to communicate with the wireless base station, the allocation controller allocating, to a second mobile terminal being different from the first mobile terminal and being one of a plurality of mobile terminals to communicate with the wireless base station, a first wireless resource that the wireless base station uses to transmit a first signal different from the same data to the first mobile terminal.

(3) According to an aspect of the embodiments, an apparatus includes a mobile terminal that receives the same data from a first wireless base station and a second wireless base station, the mobile terminal including: a receiver that receives signals transmitted from the first wireless base station and the second wireless base station through respective wireless resources allocated to the mobile terminal; and a transmitter that notifies the first wireless base station of a data encoding scheme that makes a received power of data received at the mobile terminal from the second wireless base station through a wireless resource through which the mobile terminal receives a signal different from the same data from the first wireless base station small and that is to be adopted by the second wireless base station.

(4) According to an aspect of the embodiments, a system includes a wireless communication system in which a plurality of wireless base stations transmit the same data to a first mobile terminal, wherein: each of the plurality of wireless base stations includes an allocation controller that allocates a wireless resource to a mobile terminal that is to communicate with the wireless base station; the first mobile terminal includes a receiver that receives the same data from the plurality of wireless base stations through the respective wireless resources allocated to the mobile terminal by each of the plurality of wireless base stations; the allocation controller of each of the plurality of wireless base stations allocates, to a second mobile terminal being different from the first mobile terminal and being one of a plurality of mobile terminals to communicate with the wireless base station, a first wireless resource that one wireless base station being selected from the plurality of wireless base stations and different from the wireless base station uses to transmit a first signal different from the same data to the first mobile terminal.

(5) According to an aspect of the embodiments, a method includes a method of wireless communication that a first communication unit and a second communication unit, which respectively cover a first sector and a second sector among cells formed by a wireless base station, transmit the same data to a first mobile terminal, the method including: at each of the first wireless communication unit and the second communication unit, allocating a wireless resource for signal transmission to a mobile terminal that is to communicate with the communication unit; at the second communication unit, allocating, to a second mobile terminal different from the first mobile terminal, a first wireless resource that the first communication unit uses to transmit a first signal different from the same data to the first mobile terminal; and at the second communication unit, receiving data sent from the second communication unit through the first wireless resource.

(6) According to an aspect of the embodiments, an apparatus includes a wireless base station that transmits, to a first mobile terminal, the same data from a first communication unit and a second communication unit, which respectively cover a first sector and a second sector among cells formed by the wireless base station, wherein: each of the first communication unit and the second communication unit including an allocation controller that allocates a wireless resource to a mobile terminal that is to communicate with the communication unit; and the allocation controller of the second communication unit allocates, to a second mobile terminal being different from the first mobile terminal and being one of a plurality mobile terminals to communicate with the second communication unit, a first wireless resource that the first communication unit uses to transmit a first signal different from the same data to the first mobile terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 4A and 4B are diagrams depicting an example of allocation of resource blocks to each base station in a first embodiment;

DESCRIPTION OF EMBODIMENTS

(1) First Embodiment

Hereinafter, a first embodiment will now be described.

Figure 1B:
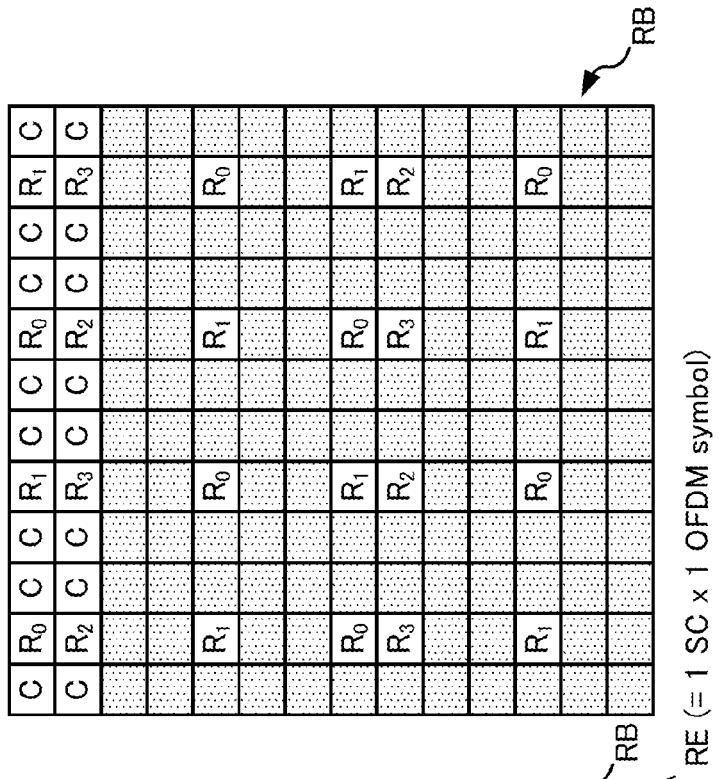
FIGS. 1A and 1B are diagrams illustrating resource blocks serving as the unit of wireless resources allocated to each user in LTE.
Figure 1A:
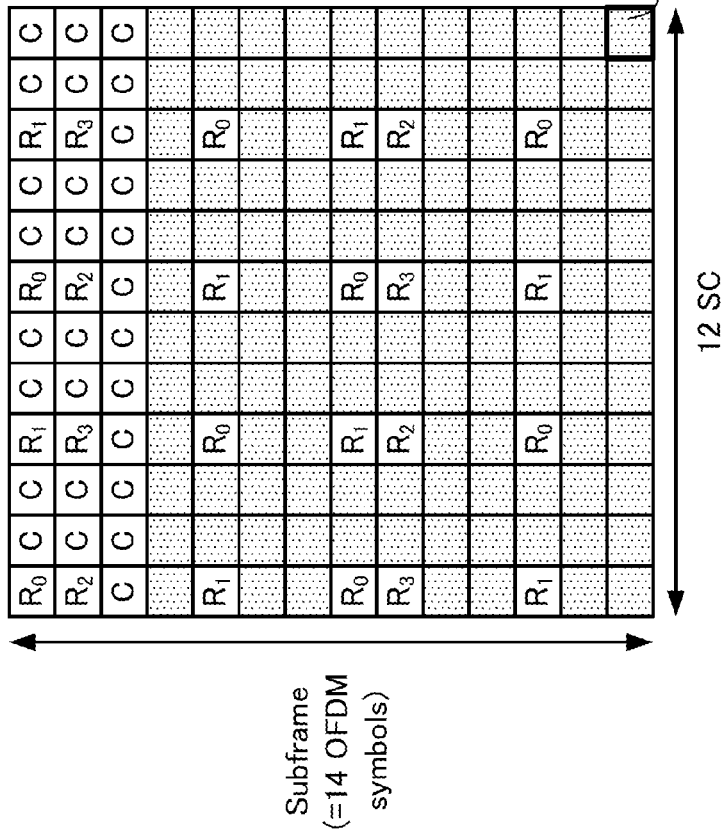
Figure 2:
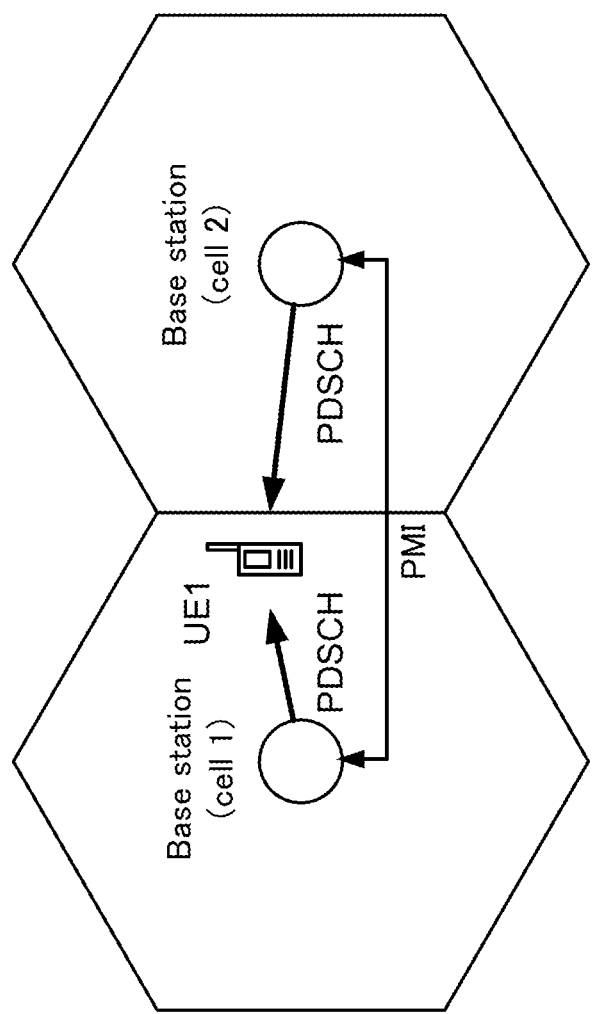
FIG. 2 is a diagram illustrating the basic concept of Join transmission (CoMP JT) serving as an embodiment of the schemes of CoMP transmission.
Figures 3A, 3B:
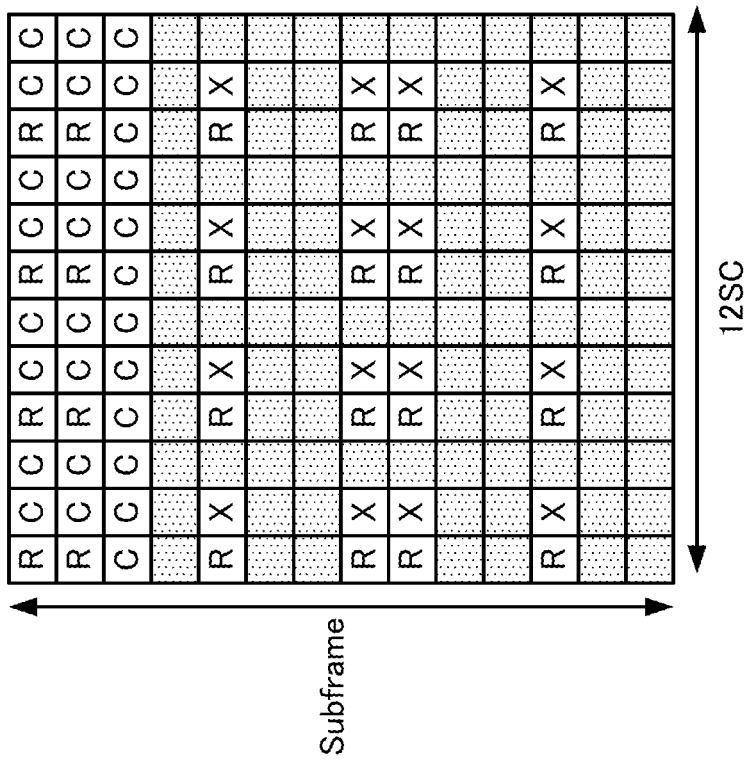
FIGS. 3A and 3B are diagrams depicting a problem caused by applying CoMP JT to multiple wireless base stations.

As illustrated in FIG. 2, multiple wireless base stations (hereinafter simply called "base stations") transmit PDSCHs based on the same data to a particular mobile terminal UE 1 incoordination with one another, that is, in the CoMP JT scheme (hereinafter called "coordinated transmission scheme), in the wireless communication system of the first embodiment. In the wireless communication system of the first embodiment, one of the multiple base stations allocates a wireless resource that maps a signal different from the PDSCH based on the data to be transmitted in the coordinated transmission scheme, the signal being a control or reference signal to a different mobile terminal to be communicate with the one base station from the mobile terminal UE 1.

Figure 5:
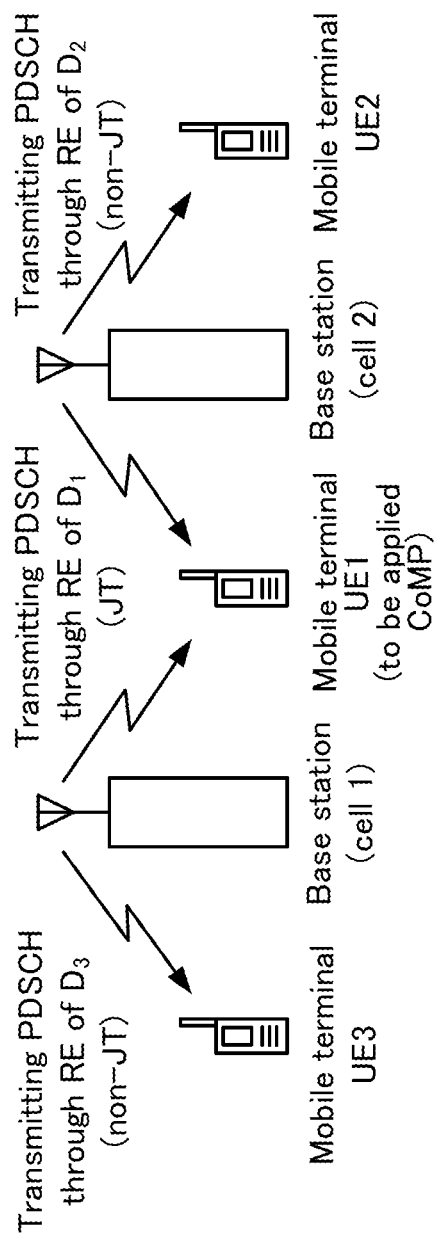
FIG. 5 is a diagram illustrating an embodiment of transmitting downlink signals to mobile terminals from the respective base stations, following the allocation of wireless resources of FIGS. 4A and 4B.

The allocation of wireless resource will now be detailed with reference to FIGS. 4A, 4B and 5. FIGS. 4A and 4B assume that the multiple base stations that transmit data to a particular mobile terminal UE 1 (first mobile terminal) in coordinated transmission scheme are two base stations related to the cell 1 and the contiguous cell 2, and illustrates an example of allocation of resource blocks in each base station. The arrangement of control signals ("C") and reference signals ("R") in FIGS. 4A and 4B are the same as those of FIGS. 1A, 1B, 3A and 3B. FIG. 5 illustrates an embodiment of transmitting downlink signals to mobile terminals from the respective base stations, following the allocation of wireless resources of FIGS. 4A and 4B.

Referring to FIGS. 4A and 4B, a PDSCH based on the same data can be arranged on a resource element that both base stations of the cell 1 and the cell 2 both can map a PDSCH. In FIGS. 4A and 4B, resource elements arranged PDSCHs based on the same data are represented by the symbol "$D_1$". Although the base station of the cell 2 does not arrange a PDSCH based on the same data as that of the base station of the cell 1 in each resource element (first wireless resource) in which the base station of the cell 1 arranges a control signal ("C") or a reference signal ("R") (first signal), the base station of the cell 2 can arrange a PDSCH based on the data destined for a mobile terminal UE 2 (second mobile terminal) different from the mobile terminal UE 1 among the mobile terminals to communicate with the station itself in the resource element. Needless to say, the PDSCH based on the data destined for the mobile terminal UE 2 is not one to be transmitted in coordinated transmission scheme. In FIGS. 4A and 4B, a resource element in which the PDSCH based on data destined for the mobile terminal UE 2 is represented by "$D_2$".

Similarly, although the base station of the cell 1 does not arrange a PDSCH based on the same data as that of the base station of the cell 2 in each resource element (first wireless resource) in which the base station of the cell 2 arranges a control signal ("C") or a reference signal ("R") (first signal), the base station of the cell 1 can arranges a PDSCH based on the data destined for a mobile terminal UE 3 (second mobile terminal) different from the mobile terminal UE 1 among the mobile terminals to communicate with the station itself in the resource element. Needless to say, the PDSCH based on the data destined for the mobile terminal UE 3 is not one to be transmitted in coordinated transmission scheme. In FIGS. 4A and 4B, a resource element to which the PDSCH based on data destined for the mobile terminal UE 3 is allocated is represented by "$D_3$".

The manner of arranging a physical channel of the first embodiment does not confirm to the LTE specification that arranges a PDSCH based on data destined for a single user in a single resource block.

Figure 6:
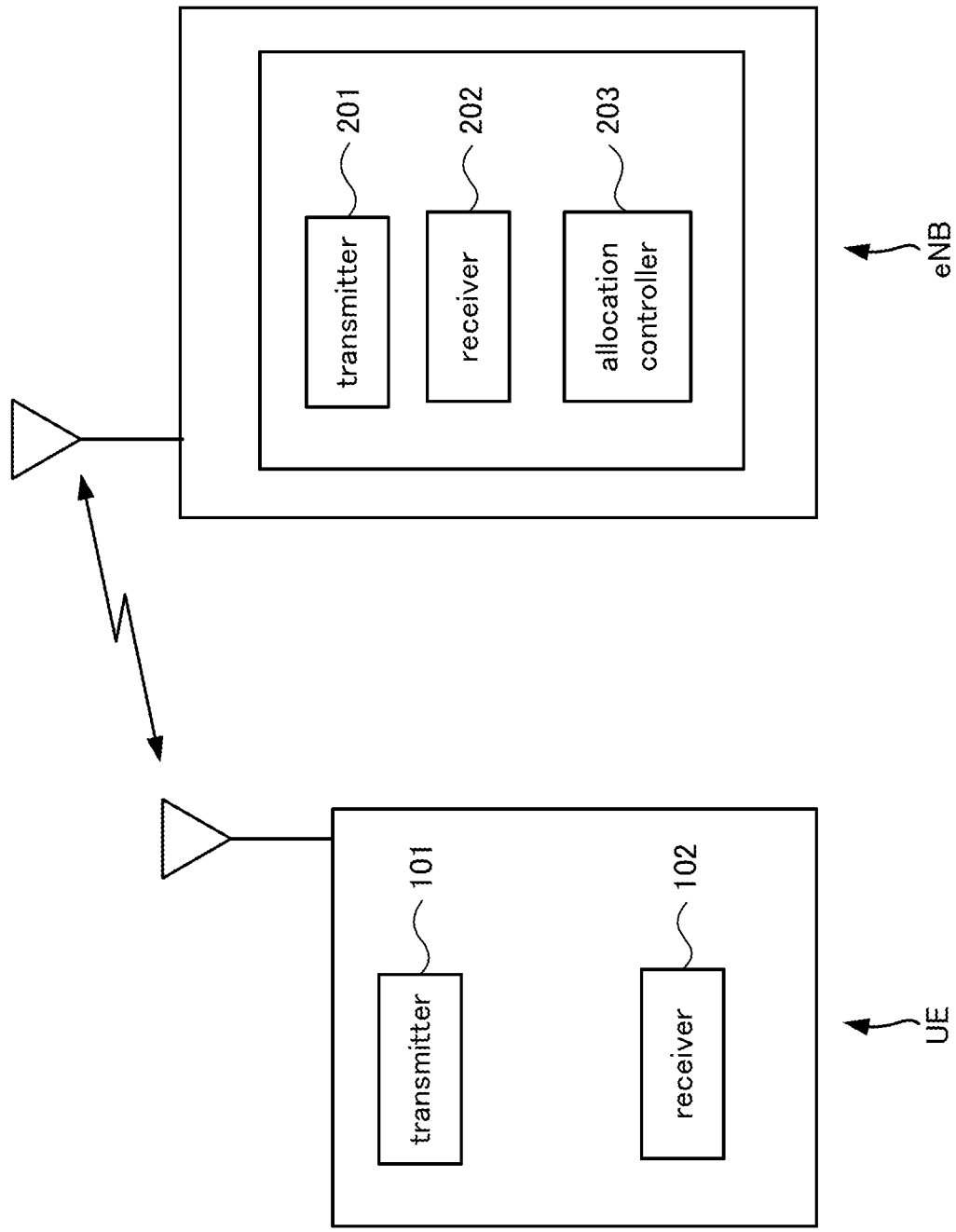
FIG. 6 is a block diagram illustrating schematic configurations of a mobile terminal and a base station of the first embodiment.

FIG. 6 is a block diagram schematically illustrating the configurations of a mobile terminal UE and a base station eNB according to the first embodiment.

Referring to FIG. 6, the mobile terminal UE includes a transmitter 101 and a receiver 102 that carry out data transmitting to and data receiving from the base station eNB, respectively. The base station eNB includes a transmitter 201 and a receiver 202 that carry out data transmitting to and data receiving from the mobile terminal UE and additionally includes an allocation controller 203. The allocation controller 203 allocates a mobile terminal that is to communicate with the base station to a wireless resource. In other words, the allocation controller 203 allocates a control signal, a reference signal, and a PDSCH (data) to the respective resource elements of the resource block for each mobile terminal to communicate with the base station. The transmitter 201 carries out encoding and modulating following to the resource blocks allocated by the allocation controller 203, and transmits a downlink signal to the mobile terminal UE.

When the mobile terminal UE receives a PDSCH (e.g., PDSCH arranged at "$D_1$" in FIGS. 4A and 4B) through the coordinated transmission scheme, the receiver 102 receives signals from multiple base stations complying with the coordinated transmission scheme, and demodulates and decodes the received signals to extract data.

As the above, when multiple base stations transmit the same data (PDSCH signal) to a particular mobile station in the coordinated transmission scheme in the wireless communication system of the first embodiment, each of the base stations carries out the following control. Specifically, each base station allocates a wireless resource through which one of the remaining base stations transmits a signal different from the above same data, that is a control signal or a reference signal, a mobile terminal to be applied the coordinated transmission scheme to a mobile terminal different from one applied to the coordinated transmission scheme among mobile terminals to communicate with the base station. This allocates data destined for another mobile terminal to a wireless communication resource into which data destined for a mobile terminal applied to the coordinated transmission scheme, so that the data transmission efficiency is enhanced.

(2) Second Embodiment

Hereinafter, a second embodiment will now be described.
(2-1) Wireless Communication System:
In the wireless communication system of the first embodiment, one of multiple base stations adopting the coordinated transmission scheme transmits a control signal or a reference signal through a wireless resource while the remaining base stations transmit PDSCHs to respective subordinate mobile terminals through the same wireless resource as the above resource. This may cause to a mobile terminal applied to the coordinated transmission scheme to have an interference between the control signal (or the reference signal) and the PDSCH. For example, FIG. 5 illustrates that the base station of the cell 1 transmits a PDSCH to the subordinate mobile terminal UE 3 through a wireless resource that the base station of the cell 2 uses to transmit a reference signal to the mobile terminal UE 1. In this case, the mobile terminal UE 1 has a possibility of not correctly receiving the reference signal from the base station of the cell 2 because the reference signal interferes with the PDSCH that the base station of the cell 1 transmits to another mobile terminal.

For the above, the wireless communication system of the second embodiment encodes data that is to be transmitted to a mobile terminal applied the coordinated transmission scheme through a wireless resource the same as that through which one of the multiple base stations transmits a control signal or a reference signal, such that the interference between the data and the control signal or the reference signal is suppressed.

In the following description, a resource element (RE) through which one of multiple base stations adopting the coordinated transmission scheme transmits a control signal or a reference signal and in which another base station can arrange a PDSCH destined for a mobile terminal not applied the coordinated transmission scheme is defined as an "available RE".

Figure 7A:
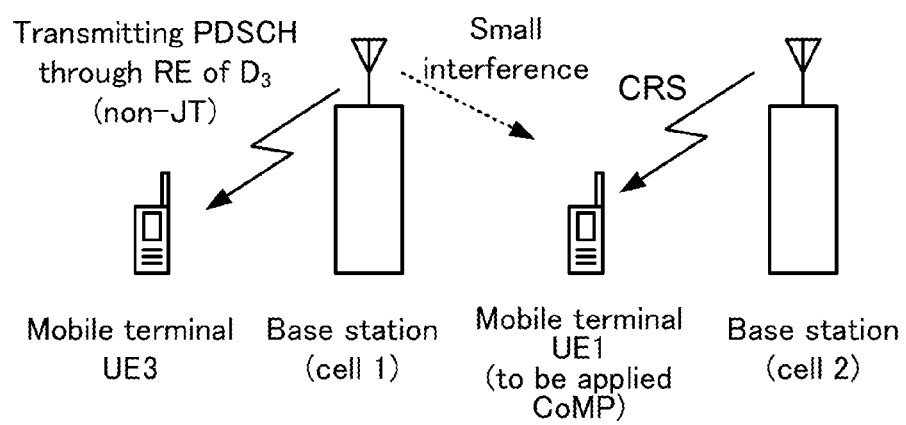
FIGS. 7A and 7B are diagrams illustrating a wireless communication system according to a second embodiment.
Figure 7B:
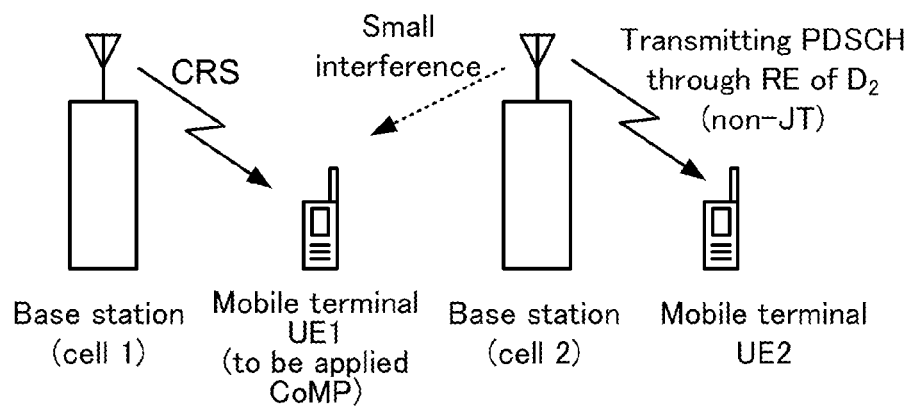

FIGS. 7A and 7B illustrate the overview of the wireless communication system of the second embodiment. Similarly to FIG. 5, FIGS. 7A and 7B illustrate that both base stations of the cell 1 and the cell 2 transmit PDSCHs based on the same data to the mobile terminal UE 1 applied the coordinated transmission scheme.

FIG. 7A assumes that the base station of the cell 2 transmits a reference signal (CRS) to the mobile terminal UE 1 through a certain wireless resource. Since the base station of the cell 1 is incapable of applying the coordinated transmission scheme in transmission to the mobile terminal UE 1 through this wireless resource, the base station of the cell 1 transmits a PDSCH to another subordinate mobile terminal UE 3. At that time, the base station of the cell 1 encodes the PDSCH destined for the mobile terminal UE 3 such that interference between the PDSCH and a reference signal from the base station of the cell 2 is suppressed.

FIG. 7B assumes that the base station of the cell 1 transmits a reference signal (CRS) to the mobile terminal UE 1 using a certain wireless resource. Since the base station of the cell 1 is incapable of applying the coordinated transmission scheme to the mobile terminal UE 1 through this wireless resource, the base station of the cell 2 transmits a PDSCH to another subordinate mobile terminal UE 2. At that time, the base station of the cell 1 encodes a PDSCH destined for the mobile terminal UE 2 such that interference between the PDSCH and a reference signal from the base station of the cell 1 is suppressed.

A preferable example of the wireless communication system of the second embodiment will now be described with reference to FIG. 8. In this wireless communication system, a base station and a mobile terminal prepare multiple Precoding matrixes common to each other. Each mobile terminal selects, on the basis of, for example, the result of channel estimation using a reference signal, a Precoding matrix that makes a received power of a desired signal from the base station large or more preferable selects a Precoding matrix that makes a received power of a desired signal from the base station the maximum. Hereinafter, the identification number PMI (Precoding Matrix Indicator) that makes a received power of a desired signal from the base station the maximum is referred to as $PMI_B$ for beam forming. On the other hand, each mobile terminal may select, on the basis of, for example, the result of channel estimation using a reference signal, a Precoding matrix that makes a received power of a desired signal from the base station small or more preferable selects a Precoding matrix that makes a received power of a desired signal from the base station the minimum. Hereinafter, the PMI that makes a received power of a desired signal from the base station the minimum is referred to as $PMI_N$ for null forming.

Hereinafter, the PMI for beam forming and the PMI for null forming in transmission from the base station of the cell i to the mobile terminal UE j are defined as $PMI_B(i, j)$ and $PMI_N(i, j)$, respectively.

Next, data transmission and reception in the wireless communication system will now be detailed with reference to FIG. 8.

Figure 8:
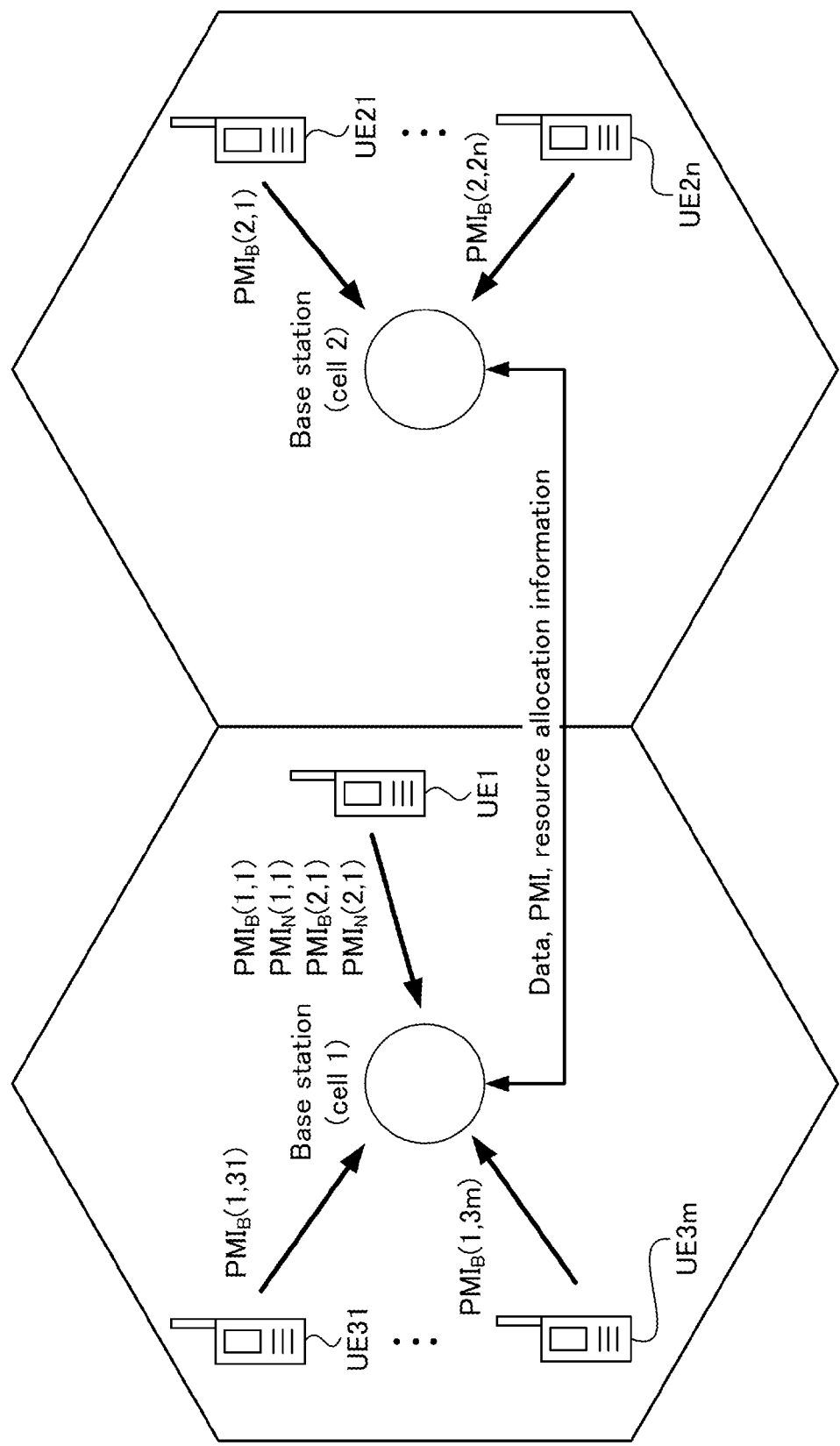
FIG. 8 is a diagram illustrating a wireless communication system according to a preferable modification of the second embodiment.

In a wireless relaying system of FIG. 8, two base stations of the cell 1 and the cell 2 transmit a PDSCH to the mobile terminal UE 1 in the coordinated transmission scheme. Here, the mobile terminal UE 1 to be applied the coordinated transmission scheme is assumed to be mainly connected to the base station of the cell 1. The remaining mobile terminals UE 31 through UE 3m in the cell 1 are communicating only with the base station of the cell 1. The remaining mobile terminals UE 21 through UE 2n in the cell 2 are communicating only with the base station of the cell 2.

The mobile terminal UE 1 notifies $PMI_B(1, 1)$, $PMI_N(1, 1)$, $PMI_B(2, 1)$, and $PMI_N(2, 1)$ on the basis of the result of channel estimation using reference signals from the base stations of the cell 1 and the cell 2. The remaining mobile terminals UE 31 through UE 3m in the cell 1 notify $PMI_B(1, 31)$ through $PMI_B(1, 3m)$, respectively, on the basis of the result of the channel estimation using the reference signals from the base station of the cell 1. The remaining mobile terminals UE 21 through UE 2n in the cell 2 notify $PMI_B(2, 21)$ through $PMI_B(2, 2n)$, respectively, on the basis of the result of the channel estimation using the reference signals from the base station of the cell 2.

The base stations of the cell 1 and the cell 2 commonly know that a PDSCH is transmitted to the mobile terminal UE 1 in the coordinated transmission scheme and also commonly know the each other's cell IDs. Accordingly, each base station knows the arrangement of reference signals in the resource block determined by the cell ID of the other base station that is to cooperatively carry out the coordinated transmission scheme.

Data to be transmitted in the coordinated transmission scheme, information about PMIs notified from the mobile terminal UE 1 to be applied the coordinated transmission scheme, and resource allocation data are transmitted and received through, for example, an X2 interface between the base stations of the cell 1 and the cell 2. Transmission and reception of the resource allocation data makes the base stations of the cell 1 and the cell 2 to grasp the positions of resource elements allocated to PDSCHs in each other's resource blocks of the base stations. For example, each base station is allowed to arbitrarily sets the number of OFDM symbols (i.e., the first to the third OFDM symbols from the top) of a control signal to be set to the first position of the resource block, and data about the number of OFDM symbols can be included in the resource allocation data. However, considering transmission delay of the X2 interface between the base stations, a resource block including a PDSCH to be transmitted in the CoMP scheme preferably sets the number of OFDM symbols of a control signal to a quasistatic number, for example, three.

Figure 9:
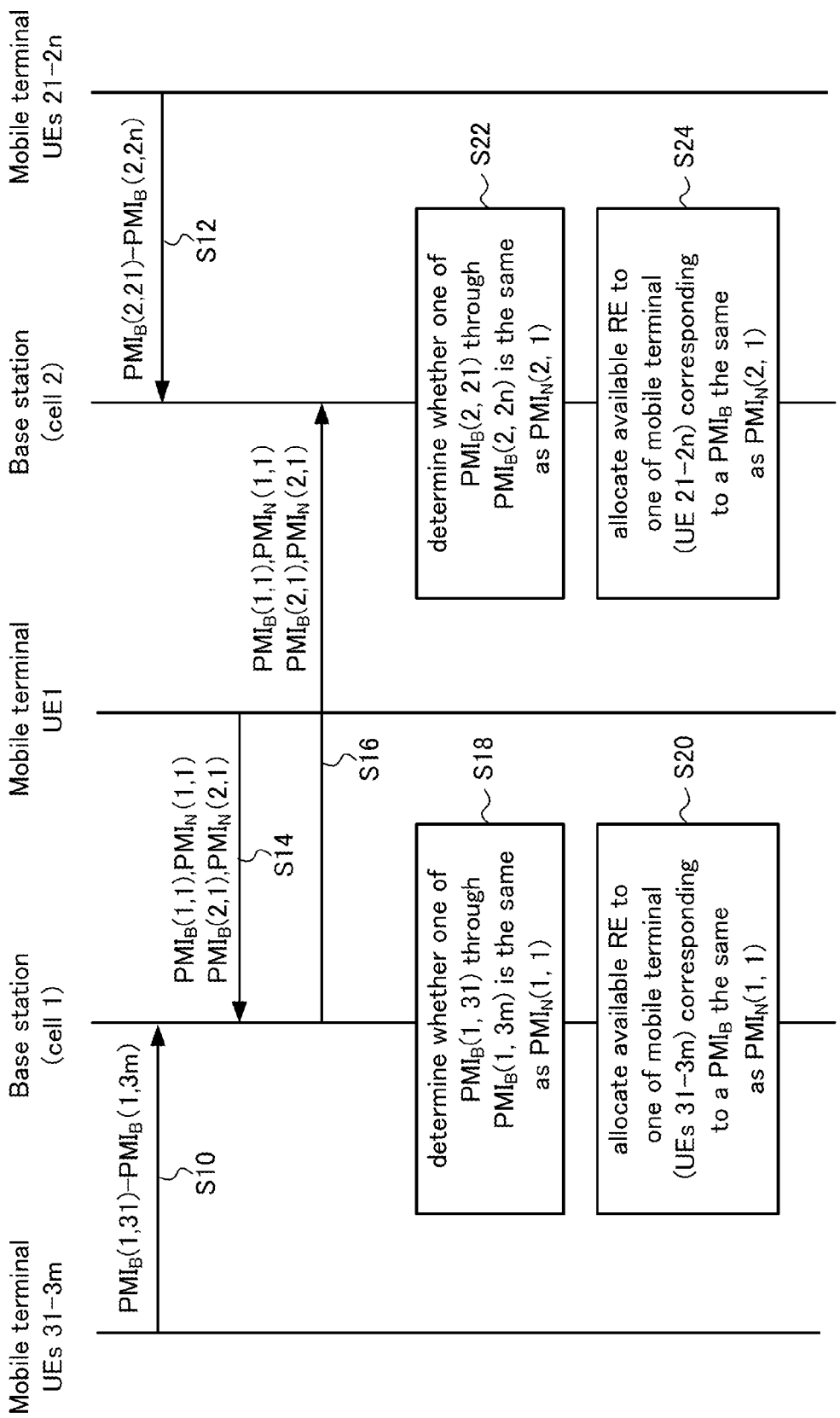
FIG. 9 is a flowchart denoting a procedure related to PMI in a wireless communication system of the second embodiment.

(2-2) Processing Related to a PMI in the Wireless Communication System:

FIG. 9 is a flow diagram depicting processing related to a PMI in the wireless communication system.

As depicted in FIG. 9, the remaining mobile terminals UE 31 through UE 3m in the cell 1 notify the base station of the cell 1 of $PMI_B(1, 31)$ through $PMI_B(1, 3m)$, respectively, on the basis of the result of the channel estimation using the reference signals from the base station of the cell 1 (step S10). The remaining mobile terminals UE 21 through UE 2n in the cell 2 notify the base station of the cell 2 of $PMI_B(2, 21)$ through $PMI_B(2, 2n)$, respectively, on the basis of the result of the channel estimation using the reference signals from the base station of the cell 2 (step S12). The mobile station UE 1 notifies $PMI_B(1, 1)$, $PMI_N(1, 1)$, $PMI_B(2, 1)$, and $PMI_N(2, 1)$ on the basis of a result of channel estimation using the reference signals from the base stations of the cell 1 and the cell 2 (step S14). The base station of the cell 1 forwards $PMI_B(1, 1)$, $PMI_N(1, 1)$, $PMI_B(2, 1)$, and $PMI_N(2, 1)$ received from the mobile terminal UE 1 to the base station of the cell 2 through the X2 interface. This makes the both base stations possible to share data of the PMIs for beam forming and for null forming between the mobile terminal UE 1 and each base station. Here, the order of steps S10, S12, and S14 is interchangeable.

In FIG. 9, $PMI_N(1, 1)$ and $PMI_N(2, 1)$ correspond to a first encoding scheme; and $PMI_B(1, 31)$ through $PMI_B(1, 3m)$ and $PMI_B(2, 21)$ through $PMI_B(2, 2n)$ correspond to a second encoding scheme.

The base station of the cell 1 determines whether one of the $PMI_B(1, 31)$ through $PMI_B(1, 3m)$ notified in step S10 is the same as $PMI_N(1, 1)$ (step S18). If the same $PMI_B$ as $PMI_N(1, 1)$ is present, one of the mobile terminals corresponding to the same $PMI_B$ is selected, and an available RE is allocated to the selected mobile terminal (one of the UE 31 through UE 3m) (step S20). The above selection of the mobile terminal and allocation of an available RE make it possible to maximize a received power at the selected mobile terminal and also suppress the interference on the mobile terminal UE 1.

The base station of the cell 2 determines whether one of the $PMI_B(2, 21)$ through $PMI_B(2, 2n)$ notified in step S12 is the same as $PMI_N(2, 1)$ (step S22). If the same $PMI_B$ as $PMI_N(2, 1)$ is present, one of the mobile terminals corresponding to the same $PMI_B$ is selected, and an available RE is allocated to the selected mobile terminal (one of the UE 21 through UE 2n) (step S24). The above selection of the mobile terminal and allocation of an available RE make it possible to maximize a received power at the selected mobile terminal and also suppress the interference on the mobile terminal UE 1.

Here, when the mobile terminal UE 1 selects a PMI ($PMI_N(1, 1)$ and $PMI_N(2, 1)$) for null forming in step S14, if none of the Precoding matrixes reduces the received powers from the base stations of the cell 1 and the cell 2 to a predetermined reference value or less, the mobile terminal UE 1 does not feed the PMI for null forming back to the base station of the cell 1. In this case, since there is a possibility of interference of the PDSCH with a reference signal or a control signal, the PDSCH is not allocated to an available RE. Since the wireless propagation environment between the base station of the cell 1 and the mobile terminal UE 1 is different from that between the base station of the cell 2 and the mobile terminal UE 1, the determination is independently made on $PMI_N(1, 1)$ and $PMI_N(2, 1)$.

In the case of the absence of a mobile terminal corresponding to the $PMI_B$ the same as $PMI_N(1, 1)$ and $PMI_N(2,$ 1) respectively in the steps S18 and S22, a PDSCH is not basically allocated to an available RE, which may be substituted by the following procedure.

Specifically, each mobile terminal notifies insteps S10 and S12 all the PMIs that makes the obtained received power more than a predetermined reference value in addition to the PMI that makes the obtained received power the maximum to each base stations. Then, determination is made whether one of the PMIs notified in steps S10 and S12 is the same as the $PMI_N(1, 1)$ and $_N(2, 1)$ respectively in steps S18 and S22. The above procedure increases the number of mobile terminals to which an available RE can be allocated in steps S20 and S24.

As the above, using wireless resource (first wireless resource) through which one of the multiple base stations that adopt the coordinated transmission scheme transmits a control signal or a reference signal, the remaining base stations carries out the following procedure in the wireless communication system of this embodiment. Specifically, each of the remaining base stations allocates a PDSCH destined for a subordinate mobile terminal thereof to the first wireless resource (i.e., an available RE). The PDSCH destined for the mobile terminal is encoded such that the interference between the PDSCH and a reference or control signal destined for another mobile terminal to be applied the coordinated transmission scheme is suppressed. The encoding is determined on the basis of a Precoding matrix for null forming that makes a received power of the mobile terminal to be applied the coordinated transmission scheme the minimum. Preferably, a mobile terminal that is to have a large received power when a Precoding matrix for null forming determined in the above manner is selected from mobile terminal being under the control of the base stations, and a available RE is allocated to the mobile terminal selected in this manner. This achieves further efficient allocation of wireless resources.

(2-3) Configurations of a Base Station and a Mobile Terminal

Next, the configurations of a base station and a mobile terminal that achieve the flowchart of FIG. 9 will now be described with reference to FIGS. 10-12.

Figure 10:
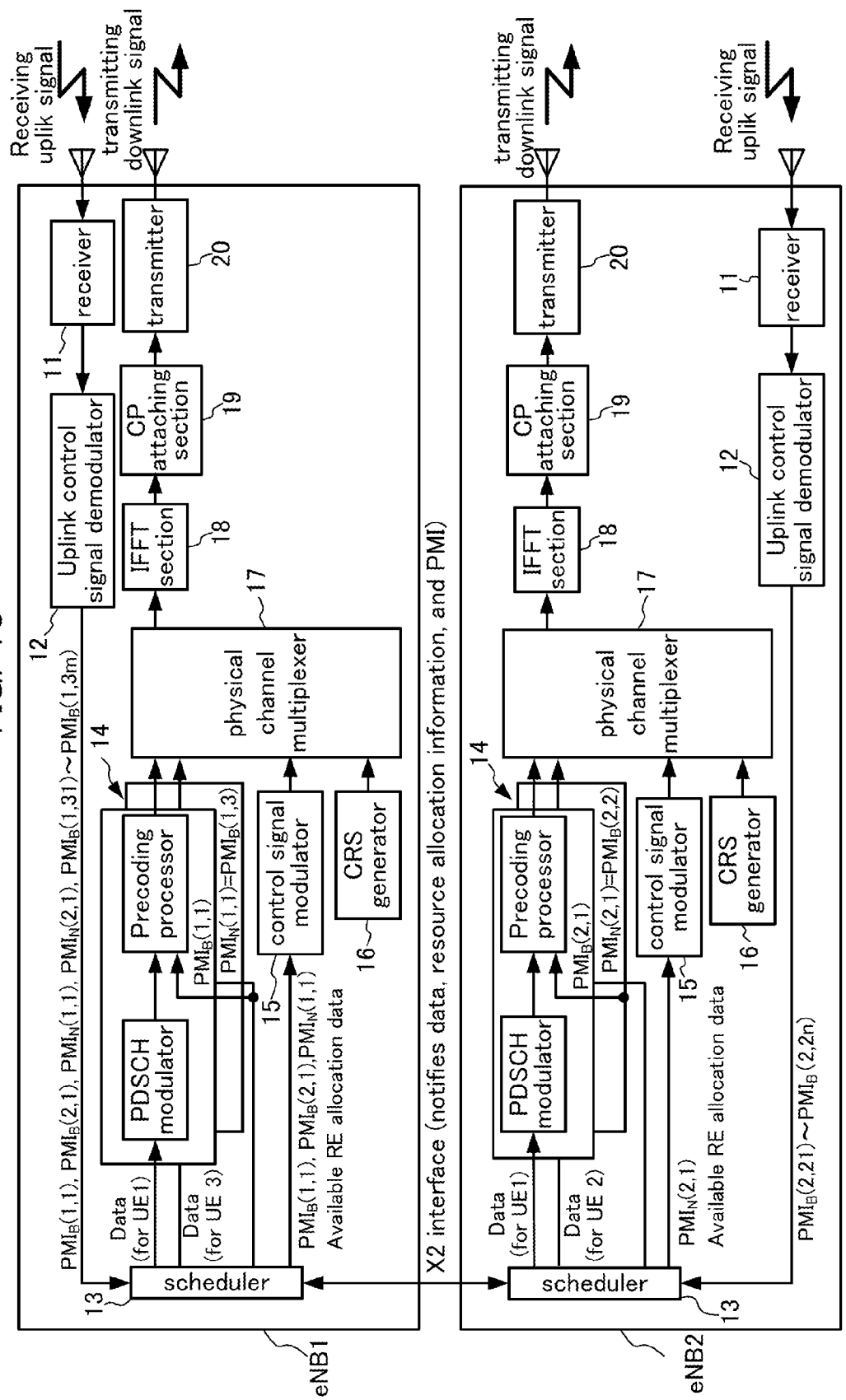
FIG. 10 is a block diagram illustrating the configuration of a base station of the second embodiment.

FIG. 10 is a block diagram schematically illustrating the configuration of a base station according to this embodiment; FIG. 11 is a block diagram illustrating the configuration of a mobile terminal to be applied the coordinated transmission scheme in this embodiment; and FIG. 12 is a block diagram illustrating the configuration of a mobile terminal not to be applied the coordinated transmission scheme.

In FIG. 10, the base station of the cell 1 is represented by a base station eNB 1 and the base station of the cell 2 is represented by a base station eNB 2. The base station eNB 1 is the same in configuration as the base station eNB 2, and therefore the same reference numbers are applied to the corresponding elements between the base station eNB 1 and the base station eNB 2. The base station eNB 1 is connected to the base station eNB 2 via an X2 interface. As illustrated in FIG. 8, a mobile terminal to be applied the coordinated transmission scheme is assumed to be mainly connected to the base station of the cell 1, that is, the base station eNB 1. The configuration of FIG. 10 assumes that the downlink wireless access technique from each base station to subordinate mobile terminal is OFDM (Orthogonal Frequency Division Multiplexing) that LTE adopts.

(2-3-1) Configuration of a Base Station (Cell 1)

Referring to FIG. 10, the base station eNB 1 includes a receiver 11, an uplink control signal demodulator 12, a scheduler 13 serving as an allocation controller, a PDSCH processor 14, a control signal modulator 15, a CRS generator 16, a physical channel multiplexer 17, an IFFT section 18, a CP attaching section 19, and a transmitter 20.

The receiver 11 converts an RF signal received at a receiving antenna to a digital baseband signal. The receiver 11 includes, for example, a bandwidth shaping filter, an LNA (Low Noise Amplifier), a local frequency oscillator, an orthogonal demodulator, an AGC (Automatic Gain Control) amplifier, and an A/D (Analog to Digital) converter.

The uplink control signal demodulator 12 selects an uplink control signal from signals received by the receiver 11, demodulates the selected signal, and extracts a control signal, which contains the following PMIs. The PMIs are then sent to the scheduler 13.

$PMI_B$ (1, 1): a PMI of a beam-forming Precoding matrix that is feed back from the mobile terminal UE 1 and that is to be used in transmission of a PDSCH from the base station eNB 1 to the mobile terminal UE 1;

$PMI_B(2, 1)$: a PMI of a beam-forming Precoding matrix that is feed back from the mobile terminal UE 1 and that is to be used in transmission of a PDSCH from the base station eNB 2 to the mobile terminal UE 1;

$PMI_N(1, 1)$: a PMI of a null-forming Precoding matrix that is feed back from the mobile terminal UE 1 and that is to be used in transmission of a PDSCH from the base station eNB 1 to the mobile terminal UE 1;

$PMI_N(2, 1)$: a PMI of a null-forming Precoding matrix that is feed back from the mobile terminal UE 1 and that is to be used in transmission of a PDSCH from the base station eNB 2 to the mobile terminal UE 1; and $PMI_B(1, 31)$ through $PMI_B(1, 3m)$: PMIs of beam-forming Precoding matrixes that are feed back from the mobile terminals UE 31 through UE 3m (i.e., mobile terminals not to be applied the coordinated transmission scheme) under the control of the base station eNB 1 except for the mobile terminal UE 1 and that is to be used in transmission of PDSCHs to the respective mobile terminals.

The scheduler 13 determines the scheduling of downlink signals to the respective mobile terminals connected to the base station eNB 1 in units of resource elements (i.e., allocation of wireless resources), determines manners of modulating and encoding downlink signals, and controls the timing of transmitting downlink signals.

The scheduler 13 determines whether a mobile terminal to be not applied to the coordinated transmission scheme is to be allocated to an available RE. This determination corresponds to step S20 (step S22 for the base station eNB 2) in the flow diagram of FIG. 9.

The scheduler 13 shares, with the scheduler of a base station eNB (in this example, the eNB 2) that cooperatively carries out the coordinated transmission scheme, data destined for the mobile terminal UE 1 to be applied the coordinated transmission scheme, resource allocation data of the both base stations, and PMI information ($PMI_B(1, 1)$, $PMI_B(2, 1)$, $PMI_N(1, 1)$, and $PMI_N(2, 1)$) related to the mobile terminal UE 1.

The PDSCH processor 14 includes a PDSCH modulator and a Precoding processor serving as an encoder. The PDSCH modulator and the Precoding processor function for each mobile terminal being connected to the base station eNB 1. The PDSCH processor error-correcting encodes and modulates a PDSCH based on data destined for a mobile terminal. The precoding processor precodes the PDSCHs output from the PDSCHs modulator using the PMIs feed back from the respective mobile terminal and thereby generates PDSCH signals in the transmitting format.

FIG. 10 illustrates an example of processing performed by the PDSCH processor 14 on data destined for the mobile terminal UE 1 to be applied the coordinated transmission scheme and data destined for the mobile terminal UE 3 not to be applied the coordinated transmission scheme. Here, the mobile terminal UE 3 is one selected for allocation to an available RE among the mobile terminals UE 31 through UE 3m being under the control of the base station eNB 1. This means that the relationship $PMI_N(1, 1)=PMI_B(1, 3)$ is satisfied.

The PDSCH processor 14 error-correcting encodes and modulates data destined for the mobile terminal UE 1 in the modulating and encoding manner determined by the scheduler 13, and further precodes the encoded and modulated data on the basis of $PMI_B(1, 1)$ fed back from the mobile terminal UE 1, so that the PDSCH signal in the transmitting format is generated. In the same manner, the PDSCH processor 14 error-correcting encodes and modulates data destined for the mobile terminal UE 3 in the modulating and encoding manner determined by the scheduler 13, and further precodes the encoded and modulated data on the basis of $PMI_B(1, 3)$ (here, $PMI_B(1, 3)=PMI_N(1, 1)$) fed back from the mobile terminal UE 3, so that the PDSCH signal in the transmitting format is generated.

The scheduler 13 generates available RE allocation data, which is first control data as to whether the PDSCH destined for each mobile terminal not to be applied the coordinated transmission scheme is allocated to an available RE, and supplies the available RE allocation data to the control signal modulator 15. An example of available RE allocation data is depicted in the following Table 1. This format takes available RE allocation data only one bit.

TABLE 1

| available RE allocation data | Details |
| --- | --- |
| 0 | transmit a PDSCH through RE in allocated RB except for available RE |
| 1 | transmit a PDSCH through available RE in allocated RB |

The control signal modulator 15 generates a control signal containing available RE allocation data as well as the information of the PMIs, i.e., $PMI_B(1, 1)$, $PMI_B(2, 1)$, and $PMI_N(1, 1)$, used in the Precoding processor, and error-correcting encodes and modulates the generated control signal in the modulating and encoding scheme determined by the scheduler 13. The CRS generator 16 generates reference information (CRS).

The physical channel multiplexer 17 frequency-multiplexes the respective physical channels of the precoded PDSCH, the control signal, and the reference signal (CRS). The multiplexed signal is converted into time-domain signals in units of OFDM symbols by the IFFT section 18, to which Guard Intervals (GI) are attached and which are then sent to the transmitter 20.

The transmitter 20 includes, for example, a D/A (Digital to Analog) convertor, a local frequency oscillator, a mixer, a power amplifier, and a filter. The transmitter 20 up-converts the base-band frequency of a base band signal from the CP attaching section 19 to a radio frequency, and emits the converted signal through a transmitting antenna out of the space.

(2-3-2) Configuration of a Base Station (Cell 2).

The process carried out by each element of the base station eNB 2 is the same as that carried out by the corresponding element of the base station eNB 1, except for the following points.

The control data extracted by the uplink control signal demodulator 12 of the base station eNB 2 includes $PMI_B(1, 21)$ through $PMI_B(1, 2n)$, which are to be provided to the scheduler 13. $PMI_B(1, 21)$ through $PMI_B(1, 2n)$ are fed back from the mobile terminals UE 21 through UE 2m (mobile terminals not to be applied the coordinated transmission scheme) being under the control of the base station eNB 2 and are PMIs for beam-forming Precoding matrixes to be used in transmitting PDSCHs for the respective mobile terminals.

The scheduler 13 of the base station eNB 2 obtains $PMI_B(2, 1)$ and $PMI_N(2, 1)$, which are data to be destined for the mobile terminal UE 1 to be applied the coordinated transmission scheme, from the base stations eNB 1 through the X2 interface between the base stations, and carries out the corresponding process.

FIG. 10 depicts an example that data destined for the mobile terminal UE 1 to be applied the coordinated transmission scheme and data destined for the mobile terminal UE 2 not to be applied the coordinated transmission scheme are processed by the PDSCH processor 14. Here, the mobile terminal UE 2 is assumed to be a mobile terminal selected for allocating an available RE among the mobile terminals UEs 21 through UE 2n under the control of the base station eNB 2. This means that the relationship $PMI_N(2, 1)=PMI_B(2, 2)$ is satisfied.

The PDSCH processor 14 of the base station eNB 2 error-correcting encodes and modulates data destined for the mobile terminal UE 1 in the modulating and encoding manner determined by the scheduler 13, and further precodes the encoded and modulated data on the basis of $PMI_B(1, 1)$ obtained from the base station eNB 1, so that the PDSCH signal in the transmitting format is generated. In the same manner, the PDSCH processor 14 error-correcting encodes and modulates data destined for the mobile terminal UE 2 in the modulating and encoding manner determined by the scheduler 13, and further precodes the encoded and modulated data on the basis of $PMI_B(2, 2)$ (here, $PMI_B(2, 2)=PMI_N(2, 1)$) fed back from the mobile terminal UE 2, so that the PDSCH signal in the transmitting format is generated.

Similarly to the base station eNB 1, the scheduler 13 of the base station eNB 2 generates available RE allocation data, which is first control data as to whether the PDSCH destined for each mobile terminal not to be applied the coordinated transmission scheme is allocated to an available RE, and supplies the available RE data to the control signal modulator 15. Since the base station eNB 1 notifies the mobile terminal UE 1 of $PMI_B(2, 1)$, the control signal from the base station eNB 2 does not have to contain the $PMI_B(2, 1)$.

Figure 11:
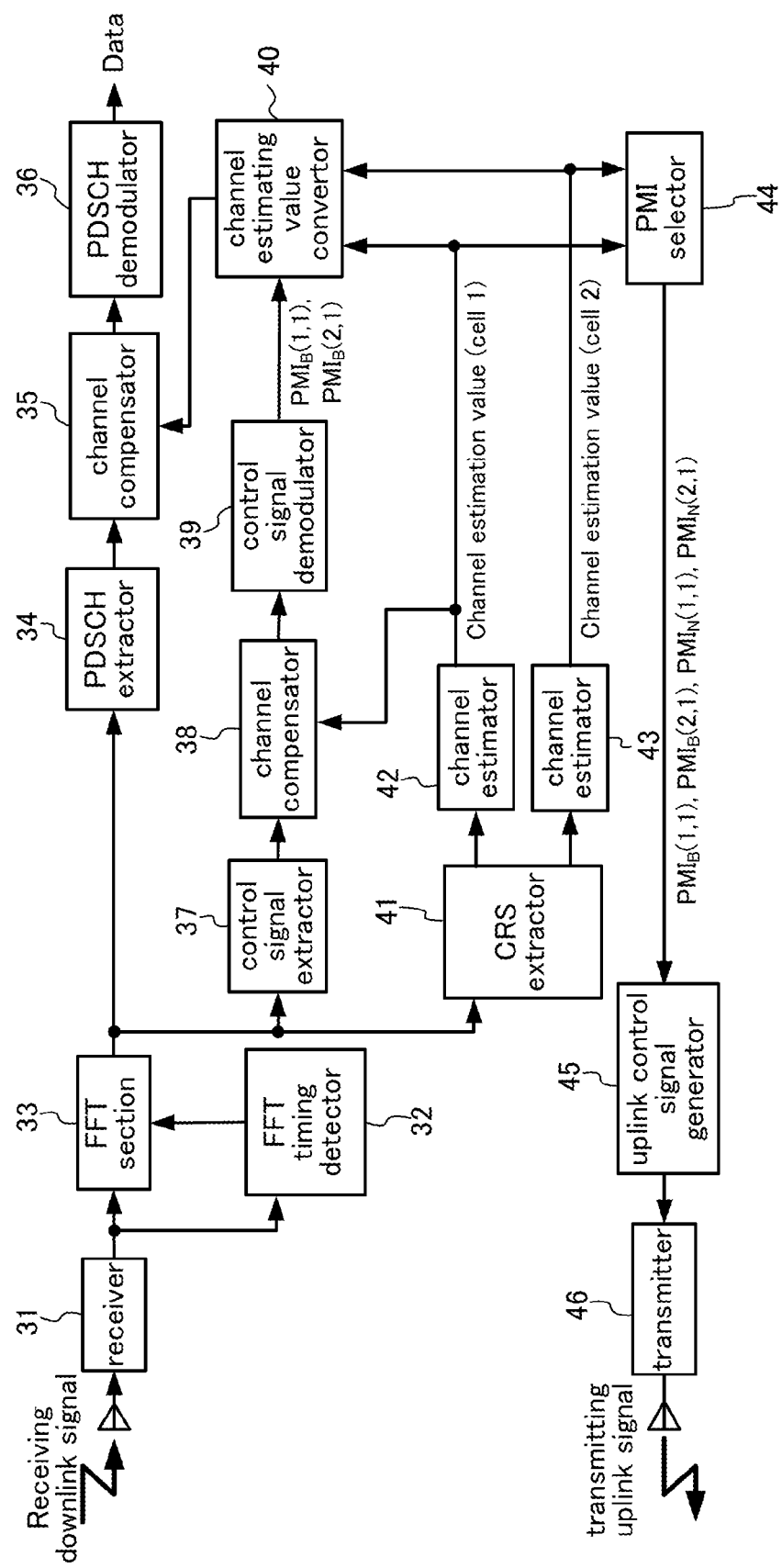
FIG. 11 is a block diagram illustrating the configuration of a mobile terminal that a coordinated transmission scheme is applied according to the second embodiment.

(2-3-3) The Configuration of a Mobile Terminal to be Applied the Coordinated Transmission Scheme:

Referring to FIG. 11, a mobile terminal to be applied the coordinated transmission scheme includes a receiver 31, an FFT timing detector 32, an FFT section 33, a PDSCH extractor 34, a channel compensator 35, a PDSCH demodulator 36, a control signal extractor 37, a channel compensator 38, a control signal demodulator 39, a channel estimating value convertor 40, a CRS extractor 41, channel estimators 42 and 43, a PMI selector 44, an uplink control signal generator 45, and a transmitter 46.

The receiver 31 converts an RF signal received from the base stations eNB 1 and eNB 2 to a digital baseband signal. The receiver 31 includes, for example, a bandwidth shaping filter, an LNA (Low Noise Amplifier), a local frequency oscillator, an orthogonal demodulator, an AGC (Automatic Gain Control) amplifier, and an A/D (Analog to Digital) converter.

The FFT section 33 performs a Fast Fourier Transform (FFT) on a received signal on the basis of an FFT timing detected by the FFT timing detector 32, so that the received signal is converted from a time-domain signal to a frequency-domain signal. Thereby, an encoded symbol string is generated for each OFDM symbol. The PDSCH extractor 34, the control signal extractor 37, and the CRS extractor 41 respectively extract a PDSCH, a control signal, and a reference signal (CRS) from the encoded symbol string.

The CRS extractor 41 extracts reference signals (CRSs) transmitted from the base stations eNB 1 and eNB 2, and calculates channel estimation values between the mobile terminal and the base stations eNB 1 and eNB 2 by correlating each the respective signal and a known reference signal. The channel estimation value (cell 1) between the mobile terminal and the base stations eNB 1 generated by the channel estimator 42 is provided to the channel compensator 38. This makes the control signal which is transmitted from the eNB 1 and which is extracted by the control signal extractor 37 possible to undergo channel compensation (i.e., compensation for a phase rotation of the transmitting signal occurred while the signal is propagating through a transmission path).

The control signal demodulator 39 demodulates and decodes the control signal subjected to the channel compensation, and the extracts the control data from the signal. $PMI_B(1, 1)$ and $PMI_B(2, 1)$ contained in the control data are provided to the channel estimating value convertor 40.

The channel estimating value convertor 40 converts a channel estimation value (cell 1) and another channel estimation value (cell 2) on the basis of the $PMI_B(1, 1)$ and $PMI_B(2, 1)$. Here, a channel matrix of the channel estimation value (cell 1) generated by the channel estimator 42 is represented by $H_1$; a channel matrix of the channel estimation value (cell 2) generated by the channel estimator 43 is represented by $H_2$; the Precoding matrixes indicated by the $PMI_B(1, 1)$ and $PMI_B(2, 1)$ are $U_1$ and $U_2$, respectively. The channel estimation value H' after the conversion by the channel estimating value convertor 40 is represented by the following expression (1).

$$H' = H_1 \cdot U_1 + H_2 \cdot U_2 \quad (1)$$

The channel compensator 35 carries out channel compensation on the PDSCH extracted by the PDSCH extractor 34 using the above channel estimation value H'. The PDSCH demodulator 36 demodulates and decodes the PDSCH subjected to the channel compensation, and extracts data from the PDSCH.

The PMI selector 44 selects, on the basis of the channel estimation values between the mobile terminal and the respective base stations eNB 1 and eNB 2 of the cells, beam-forming Precoding matrixes and null-forming Precoding matrixes between the mobile terminal itself and the respective base stations eNB 1 and eNB 2, from multiple Precoding matrix candidates already known (Codebook scheme).

Specifically, the PMI selector 44 selects a PMI related to a Precoding matrix that makes a received power of a desired signal from each base station the maximum as a beam-forming PMI. For example, received power values of vectors that are obtained by multiplying a channel estimation value (an estimated value of a channel matrix of a wireless channel) and respective Precoding matrix candidates are calculated, and the PMI related to the Precoding matrix that makes the received power value the maximum is selected as a beam-forming PMI.

On the other hand, the PMI selector 44 selects a PMI related to a Precoding matrix that makes a received power of a desired signal from each base station the minimum as a null-forming PMI. For example, received power values of vectors that are obtained by multiplying a channel estimation value (an estimated value of a channel matrix of a wireless channel) and respective Precoding matrix candidates are calculated, and the PMI related to the Precoding matrix that makes the received power value the minimum is selected as a null-forming PMI. If application of all the Precoding matrix candidates does not make the received power values less than a predetermined threshold, a null-forming PMI may be a predetermined code representing the null state such that a base station does not allocate the available RE to another mobile terminal with the intention of avoiding interference. When this predetermined code is fed back to the base station, the base station does not allocate an available RE to another mobile terminal.

$PMI_B(1, 1)$, $PMI_B(2, 1)$, $PMI_N(1, 1)$, and $PMI_N(2, 1)$, which are the beam-forming PMIs and the null-forming PMIs between the mobile terminal itself and the respective base stations eNB 1 and eNB 2, selected in the above manner are sent to the uplink control signal generator 45.

The uplink control signal generator 45 error-correcting encodes and modulates uplink control data containing $PMI_B(1, 1)$, $PMI_B(2, 1)$, $PMI_N(1, 1)$, and $PMI_N(2, 1)$ to generate an uplink control signal.

The transmitter 46 includes, for example, a D/A convertor, a local frequency oscillator, a mixer, a power amplifier, and a filter. The transmitter 46 up-converts the frequency of a baseband signal containing the uplink control signal from a baseband frequency to a wireless frequency, and then emits the signal into the space through a transmitting antenna. As the above, a mobile terminal (in this embodiment, the UE 1) to be applied the coordinated transmission scheme feeds the beam-forming PMIs and the null-forming PMIs (in this embodiment, $PMI_B(1, 1)$, $PMI_B(2, 1)$, $PMI_N(1, 1)$, and $PMI_N(2, 1)$) between the mobile station and multiple base stations adopting the coordinated transmission scheme back to the base station (in this embodiment, the eNB 1) that the mobile station is mainly connecting.

Figure 12:
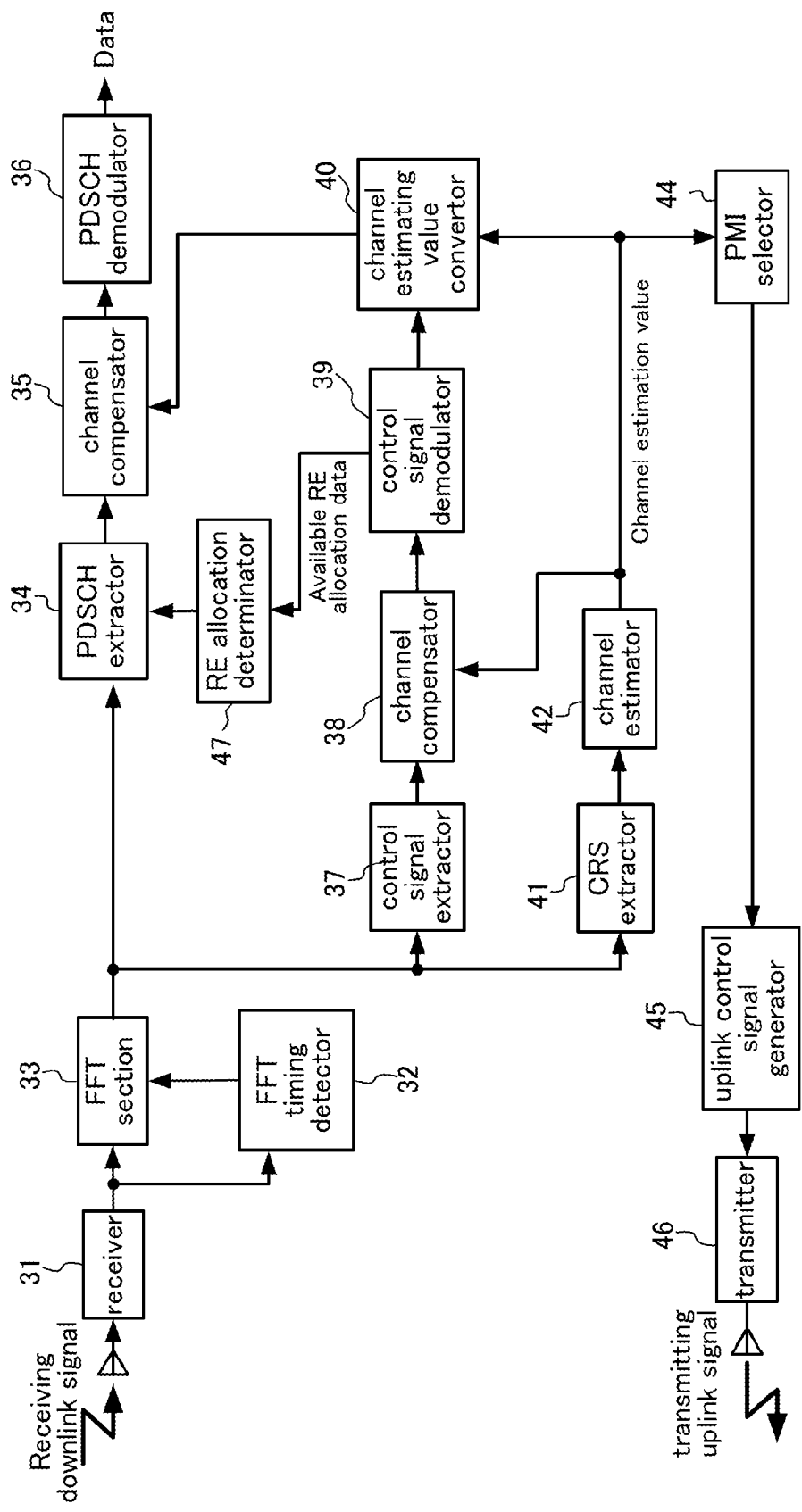
FIG. 12 is a block diagram illustrating the configuration of a mobile terminal that a coordinated transmission scheme is not applied according to the second embodiment.

(2-3-4) the Configuration of a Mobile Terminal not to be Applied the Coordinated Transmission Scheme:

Referring to FIG. 12, a mobile terminal not to be applied the coordinated transmission scheme includes the elements functioning the same as the corresponding elements of the above mobile terminal to be applied the coordinated transmission scheme except for the following operation.

Differently from the mobile terminal to be applied the coordinated transmission scheme depicted in FIG. 11, the mobile terminal not to be applied the coordinated transmission scheme calculates only a channel estimation value of the mobile terminal itself and the base station that the mobile terminal is mainly connecting, selects a beam-forming PMI based on the calculated channel estimation value, and feeds the selected PMI back to the base station. Specifically, the channel estimator 42 calculates a channel estimated value between the mobile terminal itself and either one of the base stations eNB 1 and eNB 2 that the mobile terminal is connecting. The PMI selector 44 selects, on the basis of the channel estimation values, a beam-forming PMI between the mobile terminal itself and either one of the base stations eNB 1 and eNB 2 that the mobile terminal is connecting among multiple Precoding matrix candidates. The control data containing the selected PMI is fed back to the base station that the mobile station is connecting.

Available RE allocation data contained in control data extracted by the control signal demodulator 39 is provided to the RE allocation determinator 47. The available RE allocation data is control data from a base station and represents whether an available RE is allocated to the mobile terminal as denoted by the examples in Table 1. If acknowledging that an available RE is allocated to the mobile terminal itself as a result of referring to the RE allocation data, the RE allocation determinator 47 instructs the PDSCH extractor 34 to extract the PDSCH mapped in the available RE. On the other hand, if acknowledging that an RE except for available RE is allocated to the mobile terminal as a result of referring to the RE allocation data, the RE allocation determinator 47 instructs the PDSCH extractor 34 to extract the PDSCH mapped in an RE except for the available RE.

(3) Third Embodiment

Hereinafter, a third embodiment will now be described.
(3-1) Wireless Communication System:

The wireless communication systems of the first and second embodiment assume that the coordinated transmission scheme is applied to between different base stations. Alternatively, the coordinated transmission scheme can also be applied to between different sectors in the same base station. For example, LTE allocates cell IDs to the respective sectors in the same base station, so that the first and the second embodiments are apparently applicable to between sectors. If the coordinated transmission scheme is applied to between sectors of the same base station, a first communicating unit and a second communicating unit that respectively cover a first sector and a second sector of a cell that abase station forms transmit the same data to a mobile terminal. The first and the second communicating units each include an allocation controller 203 (see FIG. 6) or a scheduler 13 (see FIG. 10) serving as the allocation controller.

Figure 13:
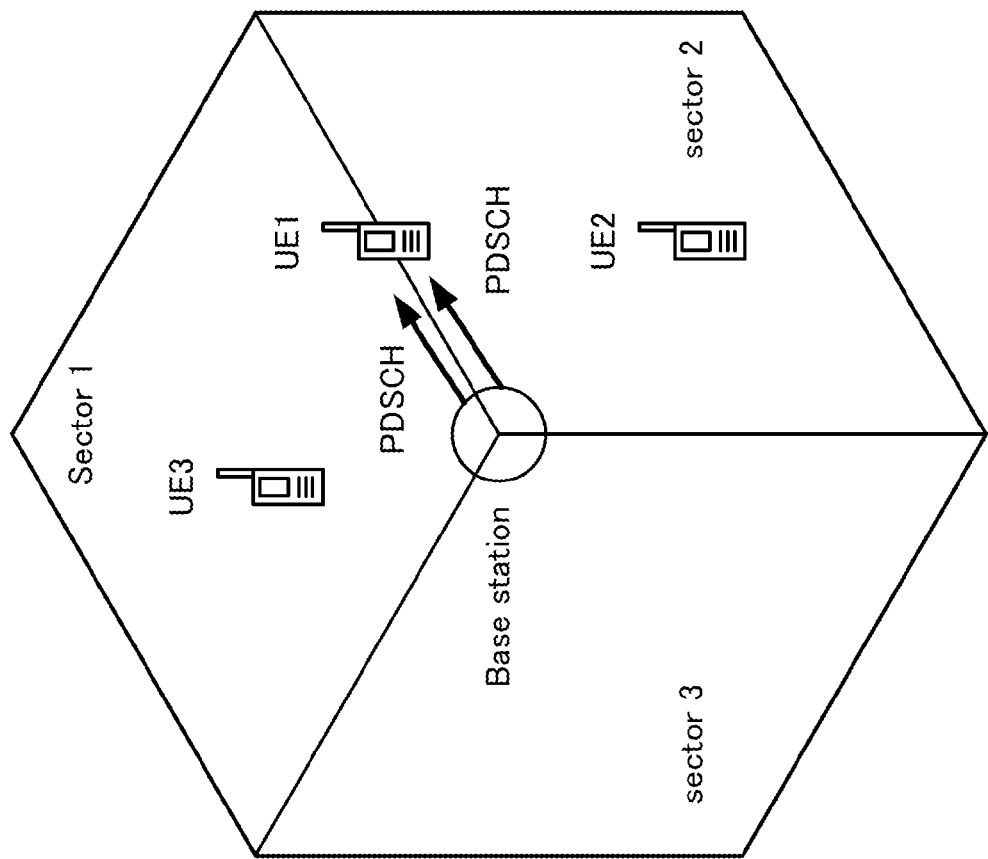
FIG. 13 is a block diagram illustrating a wireless communication system according to a third embodiment.

Hereinafter, description will now be made in relation to a case where the coordinated transmission scheme is applied to between sectors of the same base station as illustrated in FIG. 13. FIG. 13 is an example of, in a base station consisting of sectors 1-3, a mobile terminal UE 1 in the vicinity of the boundary between the sectors 1 and 2 adopting the coordinated transmission scheme.

As described above, the second embodiment preferably sets the number of OFDM symbols of a control signal of a resource block including a PDSCH to be transmitted in the coordinated transmission scheme to a quasistatic number, considering transmission delay of the X2 interface between the base stations. However, data is transmitted and received between the sectors not via an X2 interface, so that prospective delay due to the X2 interface is negligible. Accordingly, this embodiment, which adopts the coordinated transmission scheme between sectors, premises that the number of OFDM symbols of a control signal is dynamically changed.

When the number of OFDM symbols in a control signal is to be dynamically changed in a resource block containing a PDSCH to be transmitted in the coordinated transmission scheme, the positions of an available RE differs with subframes. Then, a mobile terminal of this embodiment obtains data about of the number of OFDM symbols in a control signal for each subframe so that a PDSCH arranged at the available RE is correctly demodulated and decoded. Hereinafter, among the first through the third OFDM symbols from the top in a resource block arranged for a control channel (i.e., control signal), an OFDM symbol at which a PDSCH can be arranged is defined as an "available symbol". Information (available symbol data) of an available symbol to be transmitted from the base station to a mobile terminal is exemplified as the following Table 2 and is contained in downlink control data. Furthermore, as denoted in Table 3, the number of bits to be transmitted may be reduced by including the available RE allocation data of Table 1 in available symbol data.

The available symbol data corresponds to second control data about an amount of wireless resource to be allocated to the control signal serving as a first signal.

TABLE 2

| available symbol data | details |
|---|---|
| 00 | PDSCH can be arranged at 0 symbol after the symbols for a control channel |
| 01 | PDSCH can be arranged at 1 symbol after the symbols for a control channel |
| 10 | PDSCH can be arranged at 2 symbol after the symbols for a control channel |

TABLE 3

| available symbol data | details |
|---|---|
| 00 | transmit a PDSCH through RE in allocated RB except for available RE |
| 01 | transmit a PDSCH through available RE in allocated RB and PDSCH can be arranged at 0 symbol after the symbols for a control channel |
| 10 | transmit a PDSCH through available RE in allocated RB and PDSCH can be arranged at 1 symbol after the symbols for a control channel |
| 11 | transmit a PDSCH through available RE in allocated RB and PDSCH can be arranged at 2 symbol after the symbols for a control channel |

Figure 14:
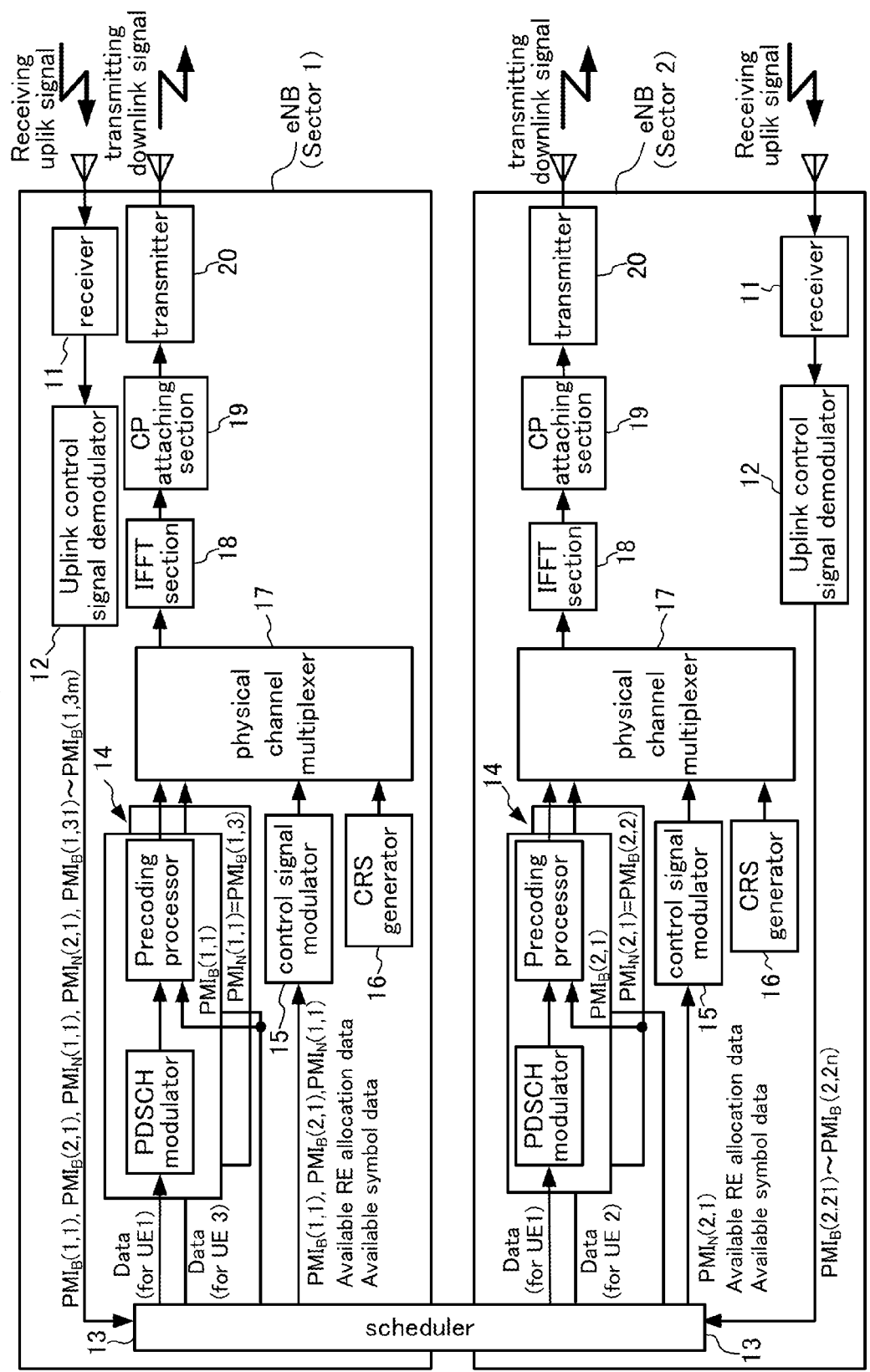
FIG. 14 is a block diagram illustrating the configuration of a base station of the third embodiment.
Figure 15:
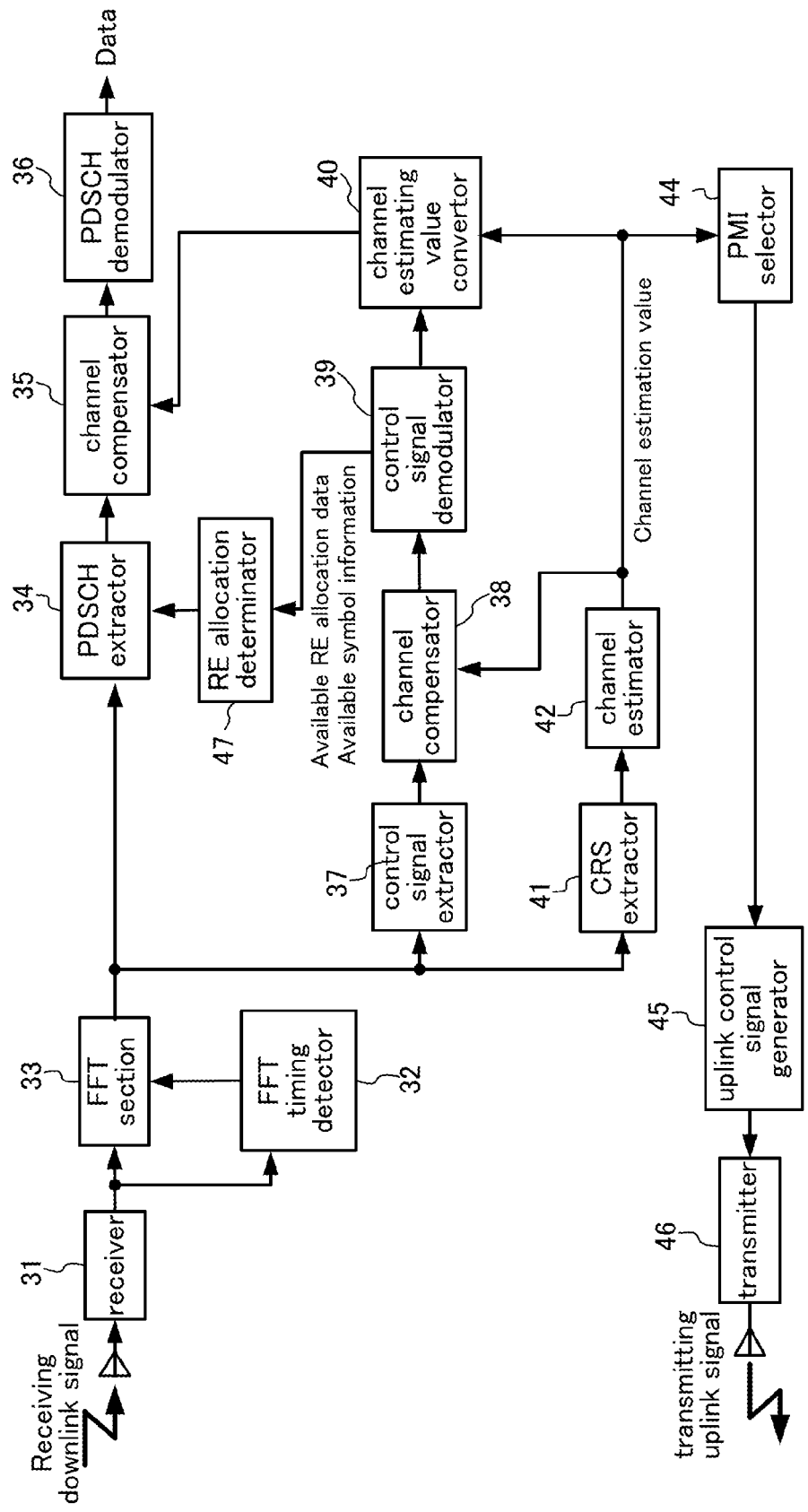
FIG. 15 is a block diagram illustrating the configuration of a mobile terminal that a coordinated transmission scheme is not applied according to the third embodiment.

(3-2) Configuration of a Base Station and a Mobile Station:

Hereinafter, the configuration of a base station and a mobile terminal not to be applied the coordinated transmission scheme of this embodiment will now be described with reference to FIGS. 14 and 15. Processes in the respective sectors in the same base station can be partially or entirely carried out by a common control device. However, FIG. 14 illustrates sectors in respectively independent blocks, and denotes that processes in the sector 1 is carried out in the base station eNB 1 (sector 1) serving as a first communication unit while processes in the sector 2 is carried out in the base station eNB 2 (sector 2) serving as a first communication unit. In FIGS. 14 and 15, elements that are the substantially same as those of FIGS. 10 and 12 are represented by the respective same reference numbers.

In the wireless communication system of this embodiment, a base station transmits available symbol data to a mobile terminal not to be applied the CoMP scheme, where the transmitted information is processed.

The base station of FIG. 14 is different from the configuration of the base station of FIG. 10 in the point that a scheduler 13 is shared so that the available RE allocation data and available symbol data are shared in the scheduler 13 not via the X2 interface. Each of the base stations eNB 1 (sector 1) and eNB 2 (sector 2) error-correcting encodes and modulates control data containing available RE allocation data and available symbol data, and then transmits the processed data to a selected mobile terminal (one not to be applied the coordinated transmission scheme).

The mobile terminal of FIG. 15 is different from the configuration of the mobile terminal of FIG. 12 in the point that the available RE allocation data and the available symbol data contained in the control data extracted by the control signal demodulator 39 are provided to the PDSCH extractor 34. The PDSCH extractor 34 extracts a PDSCH signal allocated to the mobile terminal thereof on the basis of the available RE allocation data and the available symbol data.

As described above, if the coordinated transmission scheme is applied to between sectors in the same base station, this embodiment dynamically changes the number of OFDM symbols of a control signal that is to be transmitted from the base station to a mobile terminal not to be applied the coordinated transmission scheme. This makes the base station to efficiently arrange PDSCH (data) in a resource element in which a control signal destined for a mobile terminal is not placed, so that data transmission efficiency is further improved.

The embodiments of the present invention are detailed as the above. The method of wireless communication, the wireless base station, the mobile terminal, and the wireless communication system of the present invention are not limited ones of the above embodiments, and various changes and improvement can be of course suggested. For example, each embodiment assumes that multiple base stations that transmit data to a particular mobile terminal UE 1 in the coordinated transmission scheme, i.e. multiple base stations that transmit the same data, are adjacent two base stations. But, the present invention is not limited to this. Alternatively, the present invention can also be applied to three or more base stations adopting the coordinated transmission scheme to transmitting a particular mobile terminal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A wireless communication method for a communication system,
the communication system comprising
a first wireless base station,
a second wireless base station,
a first mobile terminal, and
a second mobile terminal;
the method comprising:
performing, at the first wireless base station and the second wireless base station, a coordinated multipoint (CoMP) communication of first data with the first mobile terminal;
allocating, at the first wireless base station, a first wireless resource for a first transmission to the first mobile terminal;
transmitting, at the first wireless base station in the first transmission, a first signal from the first wireless base station to the first mobile terminal, the first signal being different from the first data;
allocating, at the second wireless base station, the first wireless resource for a second transmission to the second mobile terminal;
transmitting, at the second wireless base station in the second transmission, second data from the second wireless base station to the second mobile terminal, the second data being different from the first data; and
receiving, at the second mobile terminal, the second data in the second transmission,
wherein the method further comprises encoding, at the second wireless base station, the second data to suppress interference between the second data and the first signal.

2. The wireless communication method of claim 1, further comprising
at the first mobile terminal,
notifying the second wireless base station of a first encoding scheme that reduces a first received power of data at the first mobile terminal from the second wireless base station, the first encoding scheme being a candidate encoding scheme used in the second transmission;
at each of a plurality of mobile terminals communicating with the second wireless base station,
notifying the second wireless base station of a second encoding scheme that increases a second received power of data at the mobile terminal, the second encoding scheme being a candidate encoding scheme used in the second transmission; and
at the second wireless base station,
selecting one of the plurality of mobile terminals that notifies the second encoding scheme identical to the first encoding scheme as the second mobile terminal.

3. The wireless communication method of claim 1, further comprising
at the second wireless base station,
notifying the second mobile terminal of first control information regarding whether the second data destined for the second mobile terminal is allocated to the first wireless resource.

4. The wireless communication method of claim 1, further comprising
at the second wireless base station,
notifying the second mobile terminal of second control information regarding an amount of the first wireless resource to be allocated to the first signal.

5. A first wireless base station comprising:
a transmission unit that transmits first data to a first mobile terminal, the first data coordinately transmitted with a second wireless base station, the first wireless base station and the second wireless base station performing a coordinated multi-point (CoMP) communication for the first mobile terminal, and
an allocation controller that allocates to a second mobile terminal, a first wireless resource that the second wireless base station uses to transmit a first signal to the first mobile terminal, the first signal being different from the first data, the first data being coordinately transmitted during the CoMP;

wherein the second wireless base station is not the first wireless base station and the second mobile terminal is not the first mobile terminal, wherein the transmission unit transmits second data to the second mobile terminal using the first wireless resource, wherein the first wireless base station further comprises an encoder that encodes the second data to be transmitted to the second mobile terminal through the first wireless resource such that interference between the second data and the first signal is suppressed.

6. The first wireless base station of claim 5, wherein the allocation controller obtains, from the first mobile terminal, a first encoding scheme that makes a received power of data that the first mobile terminal is to receive from the first wireless base station small, as a scheme of encoding data by the first wireless base station, wherein the allocation controller obtains, from each of a plurality of mobile terminals communicating with the first wireless base station, a second encoding scheme that makes a received power of data that a respective mobile terminal is to receive from the first wireless base station large, as a scheme of encoding data by the first wireless base station, and wherein the allocation controller selects one of the plurality of mobile terminals that notifies the second encoding scheme identical to the first encoding scheme as the second mobile terminal.

7. The first wireless base station according to claim 5, wherein the first wireless base station notifies the second mobile terminal of first control information regarding whether the second data destined for the second mobile terminal is allocated to the first wireless resource.

8. The first wireless base station according to claim 5, wherein the first wireless base station notifies the second mobile terminal of second control information regarding an amount of wireless resources to be allocated to the first signal.

9. A mobile terminal comprising:

a receiver that receives first data from a first wireless base station and the first data from a second wireless base station, and that receives a first signal transmitted from the first wireless base station through a first wireless resource allocated to the mobile terminal, the first data being coordinately transmitted from the first wireless base station and the second wireless base station, the second wireless base station being different from the first wireless base station; and a transmitter that notifies the second wireless base station of a data encoding scheme that makes a received power of second data received at the mobile terminal from the second wireless base station small, wherein the data encoding scheme is adopted by the second wireless base station, and wherein the second data being transmitted from the second wireless base station through the first wireless resource through which the mobile terminal receives the first signal from the first wireless base station, wherein the first signal is different from the first data and the second data.

10. A wireless communication system comprising:

a plurality of wireless base stations comprising a first wireless base station and a second wireless base station; and a first mobile terminal and a second mobile terminal, wherein the first wireless base station and the second wireless base station coordinately transmit first data to the first mobile terminal during a coordinated multi-point (CoMP) communication performed for the first mobile terminal;

the first mobile terminal comprises a receiver that receives the first data from the first wireless base station and the second wireless base station;

the first wireless base station comprises a first allocation controller that allocates a first wireless resource to the first mobile terminal, the first wireless resource being used to transmit a first signal from the first wireless base station to the first mobile terminal, the first signal being different from the first data, the first data being coordinately transmitted during the CoMP; and the second wireless base station comprises a second allocation controller that allocates the first wireless resource to the second mobile terminal for communicating with the second wireless base station, wherein the second wireless base station comprises an encoder, the encoder encoding second data to be transmitted to the second mobile terminal through the first wireless resource such that interference between the second data and the first signal is suppressed.

11. The wireless communication system according to claim 10, wherein the allocation controller of the second wireless base station obtains, from the first mobile terminal, a first encoding scheme that makes a received power of data that the first mobile terminal is to receive from the second wireless base station small, as a scheme of encoding data by the second wireless base station, obtains, from each of a plurality of mobile terminals communicating with the second wireless base station, a second encoding scheme that makes a received power of data that the mobile terminal is to receive from the second wireless base station large, as a scheme of encoding data by the second wireless base station, and selects one of the plurality of mobile terminals that notifies the second encoding scheme identical to the first encoding scheme as the second mobile terminal.

12. The wireless communication system according to claim 10, wherein the second wireless base station notifies the second mobile terminal of first control information regarding whether data destined for the second mobile terminal is allocated to the first wireless resource.

13. The wireless communication system according to claim 10, wherein the second wireless base station notifies the second mobile terminal of second control information regarding an amount of wireless resources to be allocated to the first signal.

14. A wireless communication method for a communication system, the communication system comprising a wireless base station including a first communication unit and a second communication unit, a first mobile terminal, and a second mobile terminal;

the method comprising:

performing, at the first communication unit and the second communication unit, a coordinated multi-point (CoMP) communication of first data with the first mobile terminal, the first communication unit and the second communication unit respectively covering a first sector and a second sector of a plurality of cells formed by the wireless base station;

allocating, at the first communication unit, a first wireless resource for a first transmission to the first mobile terminal;

transmitting, at the first communication unit in the first transmission, a first signal from the first communication unit to the first mobile terminal, the first signal being different from the first data;

allocating, at the second communication unit, the first wireless resource for a second transmission to the second mobile terminal;

transmitting, at the second communication unit in the second transmission, second data from the second communication unit to the second mobile terminal, the second data being different from the first data; and receiving, at the second mobile terminal, the second data in the second transmission, wherein the method further comprises encoding, at the second communication unit, the second data to suppress interference between the second data and the first signal.

15. A wireless base station comprising:

a first communication unit that covers a first sector of a plurality of cells formed by the wireless base station; and a second communication unit covering a second sector of a plurality of cells formed by the wireless base station, wherein the first communication unit and the second communication unit coordinately transmit first data to a first mobile terminal during a coordinated multi-point (CoMP) communication performed for the first mobile terminal;

wherein the first communication unit comprises a first allocation controller that allocates a first wireless resource to the first mobile terminal, the first wireless resource being used to transmit a first signal from the first communication unit to the first mobile terminal, the first signal being different from the first data, the first data being coordinately transmitted during the CoMP; and wherein the second communication unit comprises a second allocation controller that allocates the first wireless resource to a second mobile terminal for communicating with the second communication unit, the second mobile terminal being different from the first mobile terminal, wherein the second communication unit comprises an encoder that encodes second data to be transmitted to the second mobile terminal through the first wireless resource such that interference between the second data and the first signal is suppressed.

16. The wireless communication method of claim 1, wherein a wireless resource is allocated in units of a resource element, the method further includes allocating, at the first wireless base station and the second wireless base station, one or more of first resource elements to the first mobile terminal for transmitting the first data, the first resource elements being allocatable in both of the first wireless base station and the second wireless base station, the allocating of the first wireless resource to the first mobile terminal is performed by allocating, at the first wireless base station, one or more of second resource elements to the first mobile terminal for transmitting the first signal, the allocating of the first wireless resource to the second mobile terminal is performed by allocating, at the second wireless base station, the second resource elements to the second mobile terminal for transmitting the second data, and the receiving of the second data at the second mobile terminal is performed by receiving the second data transmitted using the second resource elements.

* * * * *